US00RE49775E

(19) United States
(12) Reissued Patent
Jones

(10) Patent Number: US RE49,775 E
(45) Date of Reissued Patent: Jan. 2, 2024

(54) ADDITIVE MANUFACTURED THERMOPLASTIC-NANOCOMPOSITE ALUMINUM HYBRID ROCKET FUEL GRAIN AND METHOD OF MANUFACTURING SAME

(71) Applicant: Firehawk Aerospace, Inc., Carrollton, TX (US)

(72) Inventor: Ronald D. Jones, Melbourne, FL (US)

(73) Assignee: Firehawk Aerospace, Inc., Carrollton, TX (US)

(21) Appl. No.: 17/320,916

(22) Filed: May 14, 2021

Related U.S. Patent Documents

Reissue of:
(64) Patent No.: 10,286,599
Issued: May 14, 2019
Appl. No.: 15/818,381
Filed: Nov. 20, 2017

U.S. Applications:
(60) Division of application No. 17/319,988, filed on May 13, 2021, which is an application for the reissue of
(Continued)

(51) Int. Cl.
*F02K 9/72* (2006.01)
*B29C 64/118* (2017.01)
(Continued)

(52) U.S. Cl.
CPC ..... *B29C 64/118* (2017.08); *B29C 64/209* (2017.08); *B29C 64/371* (2017.08);
(Continued)

(58) Field of Classification Search
CPC ..... B33Y 70/10; B33Y 10/00; B33Y 80/00; B29C 64/118; B29C 64/371;
(Continued)

(56) References Cited

U.S. PATENT DOCUMENTS 3,002,459 A 10/1961 Harper
3,022,735 A 2/1962 Eberle
(Continued)

FOREIGN PATENT DOCUMENTS

JP 1994-200266 A 7/1994

OTHER PUBLICATIONS

Elliott et al., ""Additive Manufacturing of Small Scale Rocket Grain Cartridges with Uniformly Distributed Aluminum Particles,"" AIAA Propulsion and Energy Forum, Jul. 2016, 7 pages.
(Continued)

*Primary Examiner* — Joseph A Kaufman
(74) *Attorney, Agent, or Firm* — Fish & Richardson P.C.

(57) ABSTRACT

A hybrid rocket solid fuel grain having a cylindrical shape and defining a center port is additive manufactured from a compound of thermoplastic fuel and passivated nanocomposite aluminum additive. The fuel grain comprises a stack of fused layers, each layer formed as a plurality of fused abutting concentric circular beaded structures arrayed to define a center port. During operation, an oxidizer is introduced along the center port, with combustion occurring along the exposed port wall. Each circular beaded structure defines geometry that increases the surface area available for combustion. As each layer ablates the next abutting layer, exhibiting a similar geometry, is revealed, undergoes a gas phase change, and ablates. This process repeats and persists until oxidizer flow is terminated or the fuel grain material is exhausted. To safely achieve this construction, a fused deposition additive manufacturing apparatus, modified to shield the nanocomposite material from the atmosphere, is used.

63 Claims, 12 Drawing Sheets

Related U.S. Application Data

Pat. No. 10,286,599, which is a continuation-in-part of application No. 15/275,423, filed on Sep. 25, 2016, now Pat. No. 9,822,045, which is a continuation-in-part of application No. 12/052,934, filed on Mar. 21, 2008, now Pat. No. 9,453,479.

(60) Provisional application No. 60/896,296, filed on Mar. 22, 2007.

(51) Int. Cl.

| | |
|---|---|
| ***F02K 9/18*** | (2006.01) |
| ***B29C 64/209*** | (2017.01) |
| ***B29C 64/371*** | (2017.01) |
| ***F02K 9/12*** | (2006.01) |
| ***B33Y 70/10*** | (2020.01) |
| *B29K 55/02* | (2006.01) |
| *B33Y 80/00* | (2015.01) |
| *B29L 31/30* | (2006.01) |
| *B29L 31/20* | (2006.01) |
| *B29K 505/02* | (2006.01) |
| *B33Y 10/00* | (2015.01) |
| *B33Y 70/00* | (2020.01) |

(52) U.S. Cl.

CPC ..... *B33Y 70/10* (2020.01); *F02K 9/12* (2013.01); *F02K 9/18* (2013.01); *B29K 2055/02* (2013.01); *B29K 2505/02* (2013.01); *B29L 2031/20* (2013.01); *B29L 2031/3097* (2013.01); *B33Y 10/00* (2014.12); *B33Y 80/00* (2014.12); *F05D 2230/31* (2013.01)

(58) Field of Classification Search

CPC ..... B29C 64/209; F02K 9/18; F02K 9/12; B29K 2055/02; B29L 2031/20; B29L 2031/3097; F05D 2230/31

See application file for complete search history.

(56) References Cited

U.S. PATENT DOCUMENTS

| | | | | |
|---|---|---|---|---|
| 3,120,737 | A | 2/1964 | Holloway | |
| 3,143,446 | A | 8/1964 | Berman | |
| 3,226,928 | A | 1/1966 | Jackson | |
| 3,274,771 | A | 9/1966 | Lieberman et al. | |
| 3,316,718 | A | 5/1967 | Webb | |
| 3,348,445 | A | 10/1967 | Nadel | |
| 3,555,825 | A | 1/1971 | Dilchert | |
| 3,613,597 | A | 10/1971 | Warren et al. | |
| 3,646,597 | A | 2/1972 | Feemster | |
| 3,677,010 | A | 7/1972 | Fink | |
| 3,918,365 | A | 11/1975 | Arribat | |
| 4,357,795 | A | 11/1982 | Bastian et al. | |
| 4,729,317 | A | 3/1988 | Burdette et al. | |
| 5,062,365 | A | 11/1991 | Canterberry | |
| 5,127,223 | A | 7/1992 | Hightower, Jr. et al. | |
| 5,367,872 | A | 11/1994 | Lund | |
| 5,386,777 | A | 2/1995 | Lou et al. | |
| 5,529,648 | A | 6/1996 | Stickler | |
| 5,694,769 | A | 12/1997 | Akiba et al. | |
| 5,714,711 | A | 2/1998 | Schumacher et al. | |
| 5,715,675 | A | 2/1998 | Lou | |
| 5,721,392 | A | 2/1998 | Chan | |
| 6,016,652 | A * | 1/2000 | Smith | F02K 9/72 60/251 |
| 6,022,207 | A * | 2/2000 | Dahlin | B33Y 30/00 242/563.2 |
| 6,058,697 | A | 5/2000 | Smith et al. | |
| 6,125,763 | A | 10/2000 | Kline | |
| 6,630,093 | B1 | 10/2003 | Jones | |
| 6,796,171 | B2 | 9/2004 | Heisler | |
| 6,880,326 | B2 | 4/2005 | Karabeyoglu et al. | |
| 7,022,196 | B2 | 4/2006 | Cesaroni et al. | |
| 7,777,155 | B2 | 8/2010 | Twelves | |
| 8,387,361 | B2 | 3/2013 | Ho | |
| 9,453,479 | B1 * | 9/2016 | Jones | F02K 9/08 |
| 9,822,045 | B2 * | 11/2017 | Jones | C06B 21/0075 |
| 9,890,091 | B2 | 2/2018 | Jones | |
| 10,286,599 | B2 | 5/2019 | Jones | |
| 10,309,346 | B2 | 6/2019 | Jones | |
| 2005/0225007 | A1 | 10/2005 | Lai | |
| 2009/0314391 | A1 | 12/2009 | Crump | |
| 2010/0176247 | A1 * | 7/2010 | Kibens | F02K 9/346 244/171.3 |
| 2011/0137578 | A1 | 6/2011 | Dietrich et al. | |
| 2012/0009424 | A1 * | 1/2012 | Jelliss | B82Y 30/00 977/788 |
| 2013/0042951 | A1 | 2/2013 | Fuller | |
| 2016/0136897 | A1 * | 5/2016 | Nielsen-Cole | B33Y 30/00 425/131.1 |
| 2016/0355447 | A1 * | 12/2016 | Danforth | C06B 21/0033 |
| 2018/0169937 | A1 * | 6/2018 | Jones | B29C 64/118 |
| 2021/0387403 | A1 * | 12/2021 | Rolland | B29C 64/336 |
| 2021/0402062 | A1 * | 12/2021 | Chatzistavrou | A61L 31/086 |

OTHER PUBLICATIONS

Pham et al., "A comparison of rapid prototyping technologies," International Journal of Machine Tools & Manufacture, Oct. 1998, 38(10-11):1257-1287.

Zilliac et al., "Hybrid Rocket Fuel Regression Rate Data and Modeling," 42nd AIAA/ASME/SAE/ASEE Joint Propulsion Conference & Exhibit 9-12, Jul. 2006, 21 pages.

Elliott, et al. "Additive Manufacturing of Small Scale Rocket Grain Cartridges with Uniformly Distributed Aluminum Particles", AIAA Propulsion and Energy Forum, Jul. 25, 2016.

* cited by examiner

ADDITIVE MANUFACTURED THERMOPLASTIC-NANOCOMPOSITE ALUMINUM HYBRID ROCKET FUEL GRAIN AND METHOD OF MANUFACTURING SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue application of U.S. Pat. No. 10,286,599, and is a divisional of U.S. patent application Ser. No. 17/319,988, which is also an application for reissue of U.S. Pat. No. 10,286,599. U.S. Pat. No. 10,286,599, which was filed as U.S. patent application Ser. No. 15/818,381 on Nov. 20, 2017,* is a continuation-in-part application of U.S. patent application Ser. No. 15/275,423, filed on Sep. 25, 2016, entitled Additive Manufactured Thermoplastic-Nanocomposite Aluminum Hybrid Rocket Fuel Grain and Method for Manufacturing Same, now issued U.S. Pat. No. 9,822,045, which is a continuation-in-part application of U.S. patent application Ser. No. 12/052,934 filed on Mar. 21, 2008 entitled Solid Fuel Grain for a Hybrid Propulsion System of a Rocket and Method for Manufacturing Same, now issued U.S. Pat. No. 9,453,479, which claims priority to the provisional patent application No. 60/896,296 filed on Mar. [27]*22*, 2007 of the same title. The entire disclosure of each one of these documents is incorporated herein by reference.

BACKGROUND OF THE INVENTION

The present invention relates generally to rocket propulsion systems and specifically to hybrid rocket engines. There are three basic types of chemical rockets in use today: liquid rocket engines that use liquid propellants, solid rocket motors that use solid propellants, and hybrid rocket engines that use a combination of liquid and solid propellants.

In a conventionally designed hybrid rocket engine, the fuel is stored in the solid state, while the oxidizer is stored in either the liquid or gaseous state. Traditionally in most hybrid rocket engine designs, the solid fuel is cast-molded, extruded, or in some instances machined into a cylindrically shaped structure referred to as a fuel grain. The fuel grain is designed and formed to feature one or more internal passages running through its length. These passages are referred to as ports. The fuel grain port or ports dually serve as the hybrid rocket engine's combustion chamber or chambers, and through a gas phase change and ablation process, the fuel source.

The fuel grain is conventionally housed within a metal or fiber-reinforced polymer composite motor case designed to withstand the pressures and elevated temperatures created during the combustion process. The motor case may also feature an internal liner made from a high-temperature material to create a thermal barrier to prevent damage or burn-through during the rocket engine's operation.

The motor case, with fuel grain installed, is attached to a forward cap typically machined or cast from high-temperature metal alloys. The forward cap forms the pre-combustion chamber and houses the oxidizer injectors and ignition system. The aft end of the motor case is attached to an assembly which forms the post combustion chamber and allows secure attachment to the rocket nozzle. The assembled motor case with fuel grain installed, forward cap, and aft assembly with attached nozzle is conventionally referred to as the motor or solid section of the hybrid rocket engine.

In a conventionally designed hybrid rocket engine, liquid or gaseous oxidizer is stored separately in an integrally formed pressure vessel or tank forward of the motor section within the rocket powered vehicle. However, in some designs, liquid or gaseous oxidizer may be stored adjacent to the motor section or even remotely on the vehicle. Conventionally, the tank or pressure vessel stored liquid or gaseous oxidizer is urged through a specially designed plumbing system, typically including a flow control valve to feed oxidizer through one or more oxidizer injectors housed within the motor section forward cap; and in turn, through the fuel grain port or ports.

The motive force needed to urge the liquid or gaseous oxidizer through the oxidizer injector or injectors into the fuel grain port or ports with sufficient flow rate to support combustion may be generated by any one of several means such as enabling a liquid to gas phase change, causing an exothermic reaction using a catalyst, employing a mechanical boost pump, pre-pressurizing the oxidizer tank with an externally supplied inert gas, or using an on-vehicle high pressure tank filled with an inert gas to boost oxidizer tank pressure.

Regardless of the configuration or type of liquid or gaseous oxidizer used, the assembly of oxidizer tank, pressurizing system and associated plumbing is typically referred to as the oxidizer section. Collectively, the motor section and the oxidizer section are referred to as the hybrid rocket engine, sometimes also referred to as the hybrid rocket motor.

Hybrid rocket engines offer certain advantages over both solid rocket motors and liquid rocket engines alike. For example, once ignited, a solid rocket motor cannot be stopped until its propellant is exhausted and it cannot be throttled or restarted. Hybrid rocket engines, like liquid rocket engines, can be designed for on-command thrust termination, throttling, and engine restart. Most liquid monopropellant rocket engines use highly toxic, environmentally damaging propellants that are now considered too dangerous and to environmentally unsafe for continued use.

Compared to most liquid bi-propellant rocket engines, hybrid rocket engines are significantly less mechanically complex, and therefore more reliable and less expensive to develop, manufacture, and operate. Hybrid rockets are ideally suited to use propellants that are self-pressurizing, non-toxic, environmentally benign, operate at ambient temperatures, and require no specialized equipment for handling, transporting, and loading. Furthermore, hybrid rocket engines, due to their propellants being stored in different states of matter, are inherently immune to explosion. Immunity to explosion is of great importance to rocket-powered vehicle designers and operators. Their superior safety, mechanical simplicity compared to liquid bi-propellant rocket engines, and environmental friendliness all translate to improved reliability as well as lower development, manufacturing, and operating costs.

Despite all of their aforementioned advantages, conventionally designed hybrid rocket engines using cast-molded solid fuels like hydroxyl-terminated polybutadiene (HTPB), a form of synthetic rubber that has been the most studied hybrid rocket engine fuel to date, are rarely if ever employed for applications requiring vibration free, consistent high performance. Unfortunately, conventionally designed hybrid rocket engines using cast-molded HTPB as well as other cast-molded solid fuels, including paraffin wax, polyamides, and thermoplastics have not been able to demonstrate the vibration free, consistent, high performance required for most rocket propulsion applications.

Excessive vibration and inconsistent performance is even more pronounced when higher energetic additives such as aluminum powder have been blended into solid fuels like HTPB and paraffin wax. All of these disadvantages and inefficiencies are attributable to either the solid fuel material selected or the fuel grain production methods used. To fully understand the efficacy and advantages of the present invention, it is important to understand these disadvantages in relation to competing rocket propulsion systems as well as their respective causes.

Comparative poor hybrid rocket engine performance and their often unpredictable, even sometimes dangerous nature can be attributed to: 1) low regression rate, i.e., the rate at which the solid fuel is consumed compared to solid rocket motors, 2) adverse harmonics build-up inducing unacceptable, sometimes dangerous levels of vibration, 3) excessive solid fuel waste compared to other rocket propulsion systems, 4) low specific impulse (lsp) compared to most liquid bi-propellant rocket engines, and 5) inconsistent, unpredictable thrust performance which renders them unusable in clustered (multiple engines per launch vehicle stage or spacecraft) configurations.

1). Low Regression Rate.

For a given selection of fuels and oxidizer-to-fuel mass ratios, the thrust generated by a rocket or any type of reaction engine is approximately proportional to the mass flow rate. In a hybrid rocket engine, mass flow rate is proportional to fuel grain regression rate. In a classically designed hybrid rocket engine, particularly those using slow burning fuels like HTPB, the burning rate is further limited by the heat transfer from the relatively remote flame to the fuel grain port surface. One of the physical phenomena that limit the burning rate is the blocking effect that is caused by the injection of vaporizing fuel into the high-velocity oxidizer gas stream. Given the linear nature of the oxidizer gas stream, oxidizer/fuel vapor mixing and resulting combustion efficiency is a function of the amount of time available for mixing to occur within a classically designed hybrid rocket fuel grain port.

Attempts to increase the burning rate by mixing energetic materials like Alcoa produced Military Grade 44 aluminum powder (Rockledge, Tex.) (average particle size of 44 microns) with traditional hybrid rocket fuels using cast-molding production methods have been only marginally successful in improving rocket engine performance. Aluminum powder is highly reactive with oxygen and water. To passivate the material to become stable in atmospheric conditions for safe handling, processing, storing, transporting, and use in a rocket engine, the aluminum particle is allowed to form an outer layer of aluminum oxide (alumina), a non-combustible material that when burned acts as a heat sink causing a loss of temperature and energy within the center port.

Nano-scale Aluminum powder is thought to be the next big advancement in both solid and hybrid rocketry. Elemental Aluminum in nano-scale is significantly higher in reactivity than micron-scale powder due to its relatively high specific surface area. Unfortunately, most attempts to safely and efficaciously employ this material in both solid and hybrid rocketry have not been successful. If allowed to form an alumina shell, effectively consuming a portion of the aluminum core, much of the elemental aluminum's energetic value is lost.

In addition to the challenges associated with obtaining a uniform blend of polymer and metal powder throughout the fuel grain using the cast-molding technique, improved burning rates by use of metal additives such as aluminum have only served to exacerbate the problems associated with using relatively elastic materials such as HTPB and paraffin waxes as a primary hybrid rocket solid fuel. Moreover, attempts to improve on regression rate further using high energetic material such as ALEX powder (an ultra-fine aluminum powder produced by the plasma-explosion process) have been even less successful and have introduced a significant potential for spontaneous ignition or explosion stemming from the pyrophoric nature of these ultra-fine powders.

Despite the potential for significant increase in burning rate, on the order of 30% higher than standard Military grade 44 micron particle size aluminum powder, employing a material that will spontaneously ignite upon exposure to the atmosphere or explode on contact with water or water vapor is counter-productive to one of the most significant advantages of a hybrid rocket engine—its comparative higher safety (i.e., benign failure mode and U.S. Government recognized zero TNT equivalency) compared to other forms of chemical rocketry.

More recent efforts have involved the development of methods to stabilize the nano-scale aluminum particles by encapsulating each particle in a polymeric material; thereby, protecting the elemental aluminum from the environment. Some of these approaches, such as emersion in benzene followed by compounding with styrene to form granules of aluminum-styrene, have merit and warrant further investigation. Another developed technique involves a process in which the elemental aluminum particle, measuring 15 nm or less is produced in a reactor simultaneously with the formation of a crystalline polymer outer shell. This passivated material is safe to handle, transport, store, and use as rocket propellant, and the particle core remains 99.9% pure elemental aluminum.

This difference in the combustion scheme of a hybrid rocket engine significantly degrades the propellant burning rate compared to a solid rocket motor propellant in which the solid state oxidizer and fuel are in intimate contact. Consequently, the regression rate, using conventionally molded fuel grain materials like HTPB is typically one-tenth or less than that of most solid rocket propellants.

Structurally soft, HTPB with a Young's Modulus varying between 0.0026 GPa and 0.00756 GPa is a common polymeric binder used in solid rocketry. It has been the fuel of choice for over fifty years in many U.S. Government sponsored hybrid rocket propulsion research projects. Most of this work has involved integrating multi-port configurations into the fuel grain's design to increase the total fuel grain port surface area as a means to improve regression rate. Unfortunately, improvements in regression rate using multiport designs have been offset by reduced fuel volume loading, adverse harmonics built-up that induces excessive and sometimes dangerous levels of vibration, unpredictable thrust performance, and increased fuel waste. However, excessive vibration, unpredictable thrust performance, and increased fuel waste have also been observed in single port large hybrid rocket engine designs using both HTPB as well as faster burning, also structurally soft, paraffin wax with a Young's Modulus of 0.061 GPa. While it is generally understood that regression rate in a hybrid rocket engine is a function of fuel burn rate and port surface area, the increased regression rates achieved using multi-port grain configurations have been more than offset by reduced reliability, consistency, efficiency, and safety.

2) Adverse Harmonics and Excessive Vibration.

In any discussion about vibration in a hybrid rocket engine, it is important to keep in mind that the port within a hybrid rocket fuel grain is the engine's combustion chamber. Combustion chamber wall integrity is an essential design criterion in any reaction engine. Therefore, it is understandable that if a combustion chamber wall's structural integrity is degraded or compromised, chamber performance and reliability would likewise be degraded or compromised. Logically, an engineer would be reluctant to use a compressible, easily fractured material to fabricate a combustion chamber. But, this is exactly the case when soft, compressible, and fracture prone materials like HTPB and paraffin wax are used to construct a hybrid rocket fuel grain and its combustion chamber port or ports. To make matters more complex, given the fuel grain is also the rocket engine's fuel supply, as fuel is consumed, the port wall continually ablates and expands in diameter; thereby, increasing available surface area causing an oxidizer-fuel mixture shift from oxidizer rich to fuel rich combination. Materials such as HTPB and paraffin wax are thought to respond to high pressure gases created within the port by compressing the solid fuel against the higher-strength motor case; thereby, inducing grain fractures and erosive burning—both common occurrences in large scale HTPB and paraffin wax hybrid rocket engines.

Adverse harmonics exhibited in hybrid rocket engines, particularly pronounced in large-scale variants, is thought to be caused by a compressive-relaxation response by these soft fuels reacting to elevated chamber pressures, creating a type of trampoline effect. These oscillations can build to dangerous vibration levels and even a catastrophic over pressurization event. Cast-molded fuel grains made from these materials are also prone to structural flaws such as weak spots, air bubbles, hot spots, and fractures that are also known to cause erosive burning and erratic, unpredictable performance. Fuel fragments breaking free and blocking or temporarily blocking the rocket's nozzle have also been recorded. These phenomena are considered even more problematic in large hybrid rocket engines, especially those using multi-port designs.

3). Excessive Solid Fuel Waste.

A certain amount of residual solid fuel is expected in a hybrid rocket engine. However, in a multi-port configuration, the amount of non-combusted fuel that is expelled can be significant and in certain circumstances a safety concern. In multi-port designs, as the burn progresses and fuel is ablated and combusted, the structure between the ports ultimately losses its integrity until failure occurs. In these situations, chunks of non-combusted fuel and webbing material have been known to break free, partially and sometimes completely blocking the nozzle, which can cause a serious safety problem. In multi-port HTPB fueled hybrid rocket engine designs, the total amount of residual and unspent fuel can reach 15% or more.

4). Poor Specific Impulse.

Expressed in seconds, specific impulse (usually abbreviated lsp) is a measure of the efficiency of rocket and jet engines. By definition, it is the total impulse (or change in momentum) delivered per unit of propellant consumed and is dimensionally equivalent to the generated thrust divided by the propellant flow rate. Typically referenced as performance in vacuum for rockets, lsp is a convenient metric for comparing the efficiency of different rocket engines for launch vehicles and spacecraft.

Generally speaking, there is an inverse relationship between increased regression rate and lsp in a hybrid rocket. Whereas, regression rate speaks to the hybrid rocket engine's volumetric efficiency and thrust output as a function of fuel grain diameter, lsp relates more to the rocket engine's propellant efficiency. Ideally, rocket engine designers attempt to improve both. However, attempts to improve on hybrid rocket lsp has mainly focused on evaluating and testing different propellant combination. Whereas, a classical hybrid rocket engine uses a liquid or gaseous oxidizer and solid fuel, past experiments have been conducted on engine's that use a solid oxidizer and liquid fuels. While many of these achieved very high lsp—in the high 300 seconds (vacuum), they proved to be impractical for reasons mostly associated with the need to maintain a hydrocarbon fuel as a solid at cryogenic temperatures.

Other approaches have involved blending energetic materials such as aluminum powder into the fuel grain composition to increase lsp. However, obtaining a consistent, uniform mixture has always been a challenge using cast-molding techniques, especially when molding multi-port grains. Most conventionally designed hybrid rocket engines using nitrous oxide and polymeric fuel like HTPB average lsp is between 270 seconds to 290 seconds (vacuum), the higher figure attained with the addition of aluminum powder as an additive. While higher than most solid rocket motors, this level of performance is significantly lower than competing liquid bi-propellant systems using liquid oxygen and hydrocarbon fuels like kerosene that average between 310-340 seconds.

5). Inconsistent Thrust Performance.

Inconsistent, unpredictable thrust in a classical hybrid rocket engine is a direct consequence of all of the above listed shortcomings and problems. Inconsistent and unpredictable performance makes it impossible for a hybrid rocket engine to be seriously considered for most rocket propulsion applications and uses. Further, many of the causes of inconsistent thrust performance can be tied to the cast-molding production process used to fabricate hybrid rocket fuel grains. HTPB and paraffin wax fuel grains are typically centrifugally cast-molded, with the latter containing a small percentage of polyethylene to improve tensile strength. During the HTPB polymerizing process, small air bubbles are formed and hot spots are created due to incomplete mixing and uneven curing. HTPB fuel grains require up to 90 days or more to fully cure, and even then, their material characteristics change over time. Small air bubbles are also formed during the cooling cycle when fuel grains are cast from paraffin wax. Bubble formation is a function of the shrinkage occurring within the wax. In an attempt to reduce or eliminate unwanted air bubbles as well as other types of grain flaws and hot spots, centrifugal casting methods, taking up to 120 hours to complete, are routinely employed. Even with these measures, air bubbles, structural cracks, hot spots, and other flaws seem to be chronic for fuel grains made using the cast-molding process.

Therefore, it would be highly desirable to develop a solid fuel propellant and fuel grain architecture-topology that exhibits: 1) flawless composition, 2) a regression rate comparable to solid rocket motors, 3) significantly improved thrust consistency, 4) more thorough oxidizer-fuel mixing, 5) greatly improved specific impulse, and 6) minimal vibration—all without compromising the many safety, mechanical simplicity, and economic advantages inherent in hybrid rocket propulsion systems.

SUMMARY OF THE INVENTION

The present invention is a high performance, safe to produce, store, transport, and operate hybrid rocket solid fuel grain made from a formulation of thermoplastic solid fuel and nanocomposite aluminum additive; and more particularly, fabricated using a fused deposition type additive manufacturing apparatus.

Additive manufacturing (also referred to as 3D printing or archaically as freeform-fabrication) is the official industry standard term (ASTM F2792) for all applications of the technology. It is defined as the process of joining materials to make objects from 3D model data, usually layer upon layer, as opposed to subtractive manufacturing methodologies.

An exemplary solid fuel grain suitable for use in a hybrid rocket engine and made in accordance with the present invention has a generally cylindrical shape and defines a center port that runs axially through its length. The solid fuel grain is formed as a fused stack of layers with each layer comprising a plurality of abutting, fused concentric generally circular, disposed beads of material suitable as a hybrid rocket fuel, with each such concentric generally circular shaped bead thus formed, depending upon the additive manufacturing process used, as a ring with a defined cross sectional shape. The plurality of ring-shaped disposed beads is configured in a concentric pattern of increasing radii arrayed around the center port or center opening and made from extruding and disposing a formulation of thermoplastic-nanocomposite aluminum material.

After being loaded into a hybrid rocket engine's solid section, concurrent with ignition actuation to elevate the temperature within the center port above the thermoplastic fuel's ignition or glass transition temperature and the nanocomposite aluminum's ignition temperature, a liquid or gaseous oxidizer is introduced into the solid fuel grain through one or more multiple injectors along a pathway defined by the center port causing a thin layer of the center port wall to phase change from solid to gas vapor.

Using a thermoplastic fuel formulation such as 95% by mass Acrynotrile Butadiene Styrene (ABS) and 5% nanocomposite aluminum, phase change will occur from solid to gas vapor along the exposed surface area of the solid fuel grain port wall. The resulting combined fuel vapor and nanocomposite aluminum then mixes with the oxidizer to form a fuel/oxidizer mixture suitable for rocket engine combustion. The resulting combusted reaction mass is expelled at high temperature and pressure through the rocket engine's nozzle (conventional de Laval or aerospike) at a supersonic speed to generate thrust. Generally, fuel formulations with a ratio in a range from about 75% (ABS)/25% (nanocomposite aluminum) up to about 95% (ABS)/5% (nanocomposite aluminum).

Each layer, comprised of a plurality of fused concentric circular beaded structures of different radii, exhibits a geometry that is designed to expose more surface area along the center port wall for combustion than would otherwise be possible if the center port wall were of a smooth, uniform cast-molded design. During hybrid rocket engine operation, starting with the center port wall and working outward, each beaded concentric ring structure, after undergoing phase change and ablation, is replaced by the next abutting beaded concentric ring structure. This process is repeated and persists throughout the rocket engine's operation until either the oxidizer flow is terminated or the solid fuel is exhausted.

Unlike prior art constructions that attempt to increase regression rate using cast-molded multi-port grain architecture featuring smooth port walls at the sacrifice of fuel loading, increased fuel waste, and induced excessive vibration, the additively manufactured solid fuel grain of the present invention supports smooth, consistent rocket engine operation at regression rates previously unobtainable in a single port design. Further, by replacing cast-molding production methods with additive manufacturing methods, grain flaws chronic to both cast-molded fuel grains made from HTPB and paraffin wax are eliminated.

Another exemplary solid fuel grain suitable for use in a hybrid rocket engine and made in accordance with the present invention is formed as described in the above exemplary example, but with each concentric beaded ring structure possessing a pattern that both increases the surface area available for combustion and creates, in its plurality of fused stacked layers, a rifling-type pattern within the port wall. This pattern is designed to induce oxidizer swirling flow around the center port axis rather than laminar or streamline flow; thereby creating a vortex within the center port to enable oxidizer and gaseous fuel to spend more time within the center port thereby more time to mix and combust more thoroughly than would otherwise be possible. This pattern is defined in the inner circumferential surface (i.e., the surface facing toward the interior of the fuel or rocket motor casing) of each beaded ring-like structure. As a beaded ring ablates due to combustion in the combustion chamber, the next beaded ring presents, which also has a pattern in its inner-facing circumferential surface. With this configuration, the pattern is presented in each ring-like structure as each ring is lost or ablates due to combustion in the chamber.

Again, as in the above examples, the pattern thus engineered into the fuel grain topology will persist throughout the rocket engine's operation until either oxidizer flow is terminated or the solid fuel is exhausted. Prior art constructions have employed swirling type oxidizer injectors to induce vortex flow. However, this technique is only partially effective as it cannot generate axial flow throughout the length of the fuel grain and its center port. In another embodiment, rifling patterns have been imprinted onto the molded fuel grain's port wall as a means to induce axial oxidizer-fuel gas flow. Unfortunately, any vortex generated in this manner is only momentary due to the surface pattern being quickly ablated and not repeated.

In contrast, the solid fuel grain of the present invention supports smooth, consistent rocket engine operation at regression rates and at lsp levels previously unobtainable in hybrid rocket engines. Higher energetic combustion, on the order of 50% or higher than hybrid fuel grains using aluminum oxide capped micron particle size aluminum additive, enables rocket engine designers the opportunity to design hybrid rocket engines with significantly reduced propellant loading to meet dimensional restrictions and performance requirements for many rocket powered vehicle applications that heretofore, developers would not consider a hybrid rocket engine.

To achieve such a construction, the solid fuel grain is preferably manufactured using any one of several available fused deposition type additive manufacturing machines capable of fabricating articles in a formulation of thermoplastic fuel and nanocomposite aluminum additive.

DETAILED DESCRIPTION OF THE INVENTION

The present invention is a solid fuel grain for a hybrid rocket engine and a method for manufacturing same; and more particularly, a solid fuel grain manufactured using a fused deposition type additive manufacturing apparatus.

Figure 1:
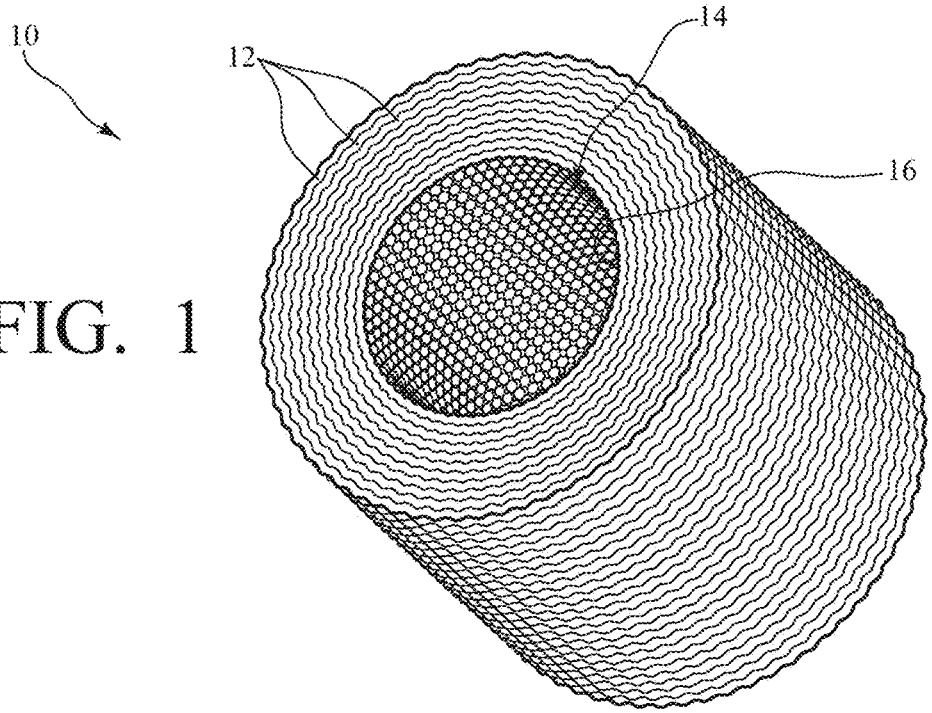
FIG. 1 is a perspective view of a solid fuel grain section made in accordance with the present invention.
Figure 2:
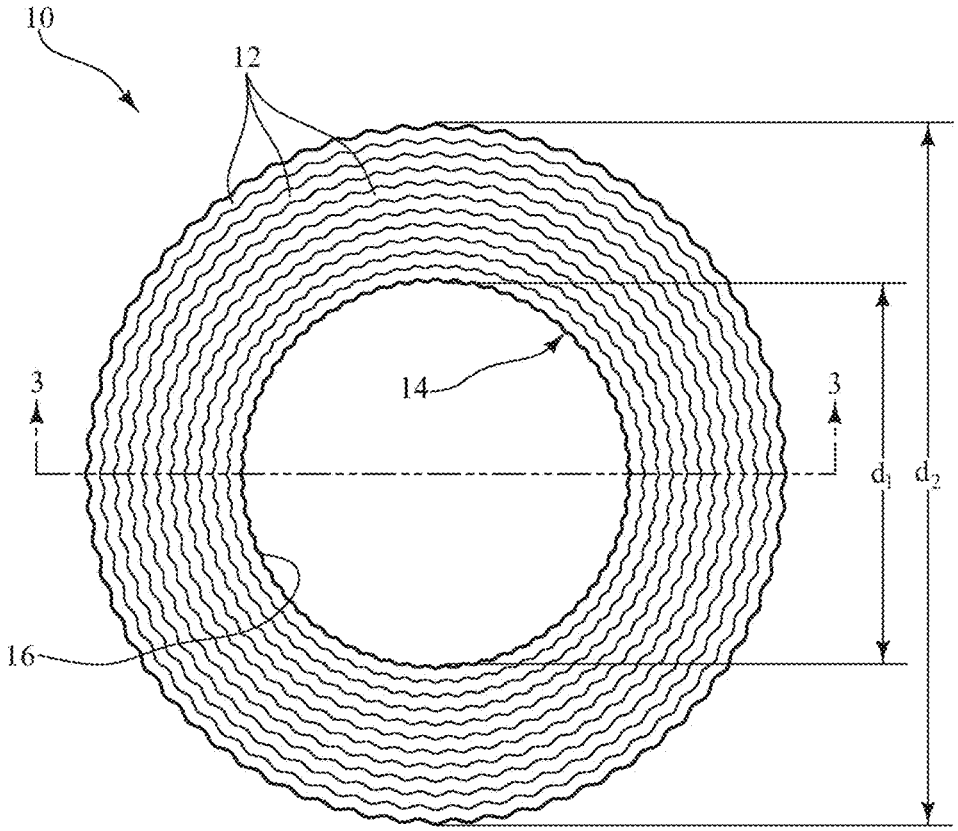
FIG. 2 is a top view of the solid fuel grain section of FIG. 1.
Figure 3:
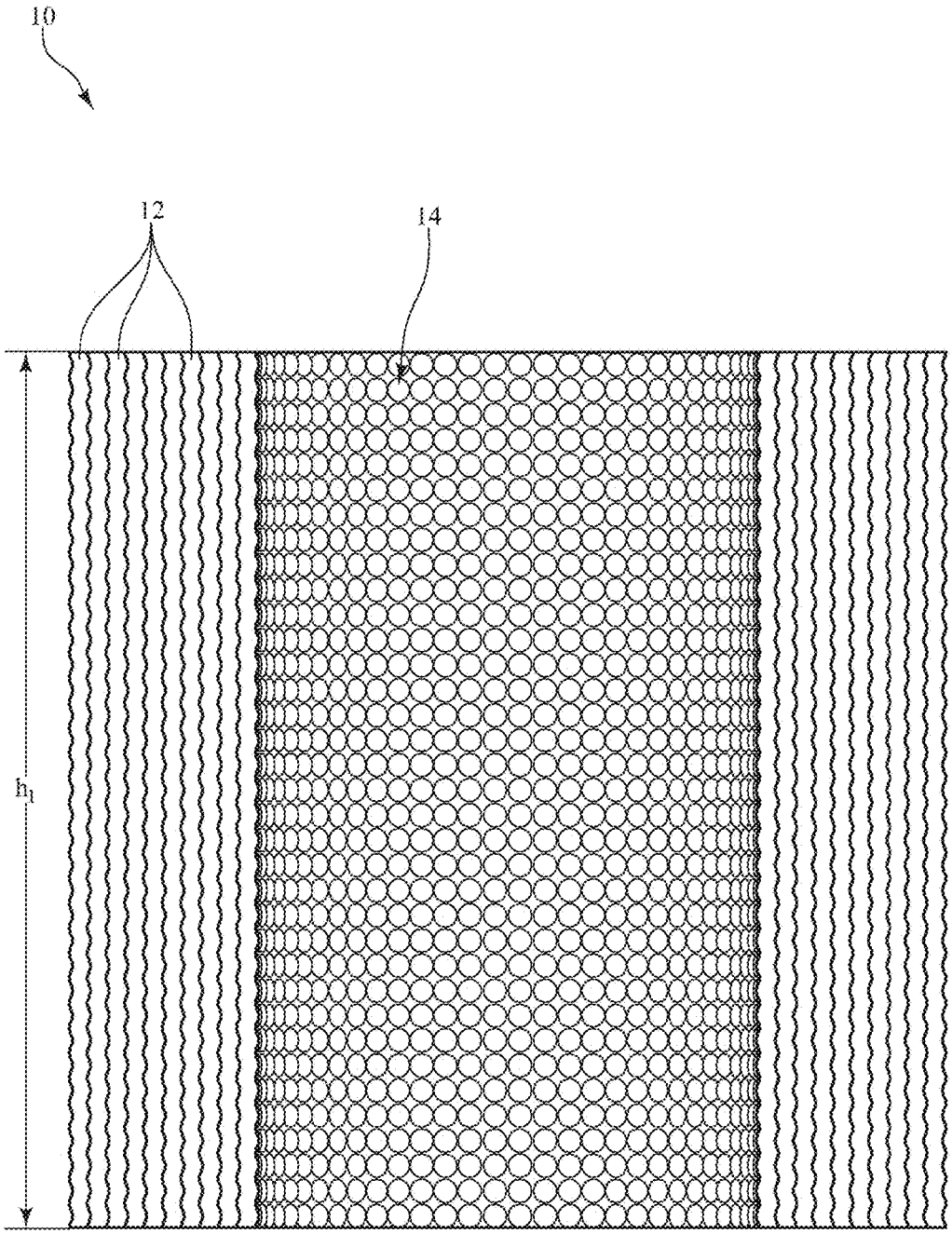
FIG. 3 is a sectional view of the grain section of FIG. 1, taken along line 3-3 of FIG. 2.

FIGS. 1-3 are various views of an exemplary solid fuel grain section 10 suitable for use in a hybrid rocket engine and made in accordance with the present invention. The fuel grain section 10 has a generally cylindrical shape and defines a center port 16. In this exemplary embodiment, the center port 16 has a substantially circular cross-section, but the center port 16 could have other geometries, such as a star, clover leaf, or polygon without departing from the spirit or scope of the present invention.

More importantly, the solid fuel grain section 10 is formed as a fusion (bonded) stack of layers with each such layer formed as a series of abutting fused concentric ring-shaped beads of solidified material 12 arrayed around the center port 16. In one embodiment, a heat gun with an ABS stick is used to bond the individual layers. The viscous ABS is applied between the sections before aligning and joining the layers. As is known by those skilled in the art, other adhesives can be used to join the layers.

As is further described below, when incorporated into a hybrid rocket engine, an oxidizer is introduced into the solid fuel grain section 10 along a pathway defined by the center port 16, with combustion occurring along the exposed surface area of the solid fuel grain section 10 port wall. Accordingly, each concentric ring-shaped structure possesses a geometric pattern 14 that serves to increase the surface area for combustion compared to a smooth concentric circular structure or smooth walls as consistent with cast-molded constructions. As each such concentric ring-shaped bead undergoes phase change from either solid to gas or solid to entrained liquid droplet, the abutting concentric bead is exposed to the flame sheet. This process continues and persists during the hybrid rocket engine's operation until either oxidizer flow is terminated or the solid fuel is exhausted. Unlike prior art constructions that improve regression rate by increasing the surface area exposed to the flame sheet using a multi-port architecture at the sacrifice of fuel loading, the solid fuel grain of the present invention presents increased surface area as a means to improve regression rate, but without the disadvantages associated with multi-port configurations.

Although the fuel grain section 10 may be manufactured in various sizes or dimensions, in this exemplary embodiment, the fuel grain section 10 has an outer diameter, d2, of 19.0 inches. Although a wide range of diameters and fuel grain lengths (or sectional lengths) are possible, the center port 16 has an initial diameter, d1, of 4.0 inches in this exemplary embodiment (although a larger diameter is shown in FIG. 3 to enable a better view of the interior of the fuel grain section 10). Although many different fuel grain diameters can be achieved with the additive manufacturing process of the present invention, traditionally a ratio of about 5:1 (outer diameter to inner diameter) is used for a hybrid rocket fuel grain.

Each of the stacked fused layers in this exemplary embodiment would have an approximate thickness ranging from 0.005 inches to 0.015 inches depending upon the additive manufacturing machine layer setting or extrusion dye used, as is further described below.

In this exemplary embodiment, each of the stacked layers 12 is formed by the deposition of viscous polymer which is extruded following a roughly circular tool path forming a plurality of solidified abutting ring-shaped beads of material. Viewed in cross section as depicted in FIG. 11, each ring shaped bead of solidified material 90 is oval or elliptical in cross sectional shape, which flattens on its bottom under its own weight as the material cools and flattens on the top as the weight of the next extruded layer of abutting ring shaped beads of material is deposed above it.

As for the concentric ring-shaped beaded structures thus fabricated, as stated above, the objective is to increase the surface area presented to the flame zone for combustion within the center port 16 in a manner which is persistent throughout the hybrid rocket engine's operation. In this exemplary embodiment, and as illustrated in FIGS. 1-3, the surface pattern presented to the flame zone is characterized by a series of projections and depressions (according to other embodiments the surface pattern comprises a plurality of ribs, a plurality of undulations, a plurality of protrusions and recessions) extending radially into the center port in this case forming elongated undulations that extend axially through the center port. These undulations are present in each concentric circular ring-shaped beaded structure such that as one ring-shaped beaded structure is ablated, the next-presented ring-shaped structure is revealed, presenting the same geometric pattern, but with increased radii.

Figure 11:
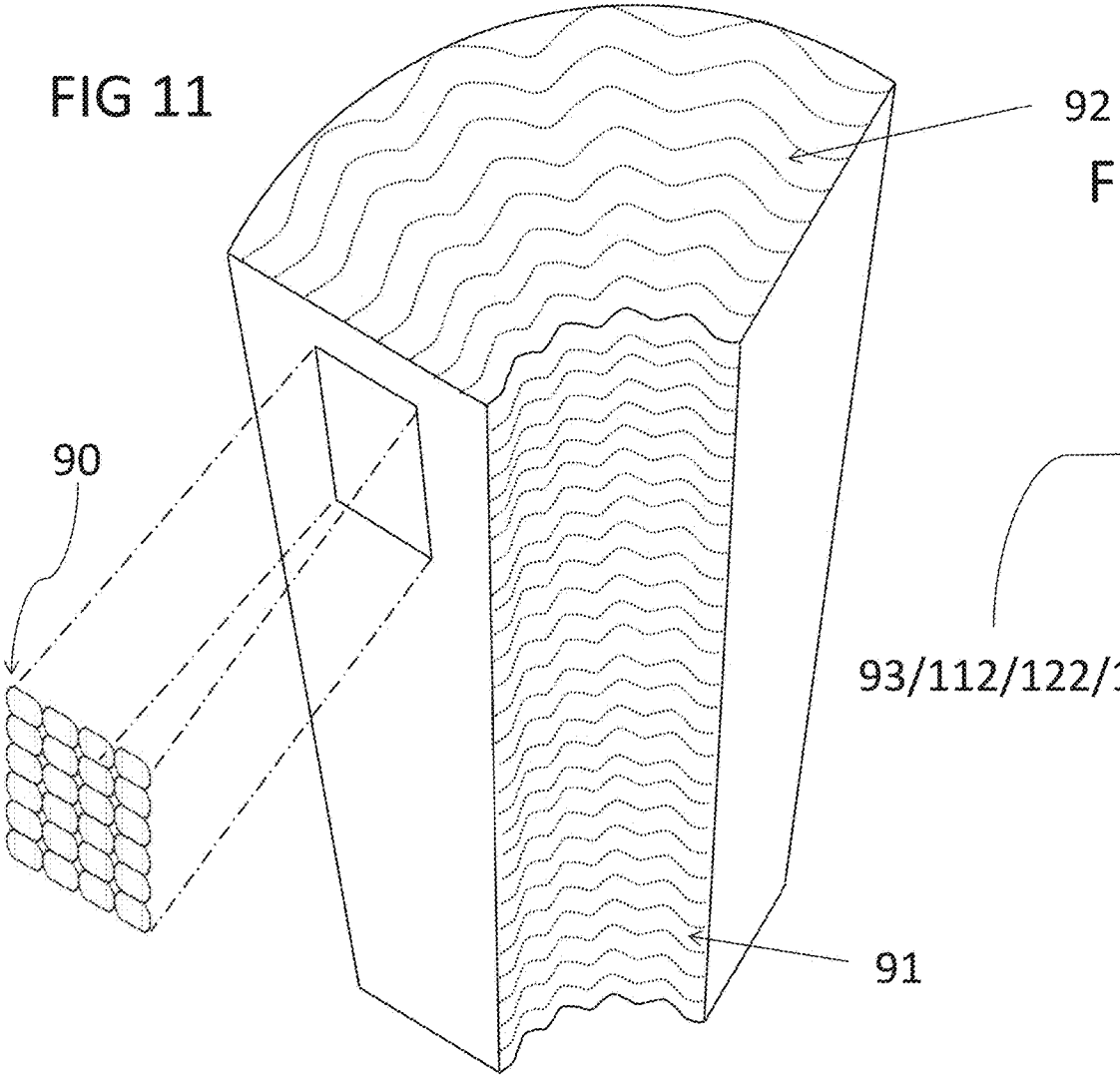
FIG. 11 depicts a quarter sectional view of the fuel grain section of FIG. 1 featuring a concentric corrugation topology grain pattern.
Figure 12:
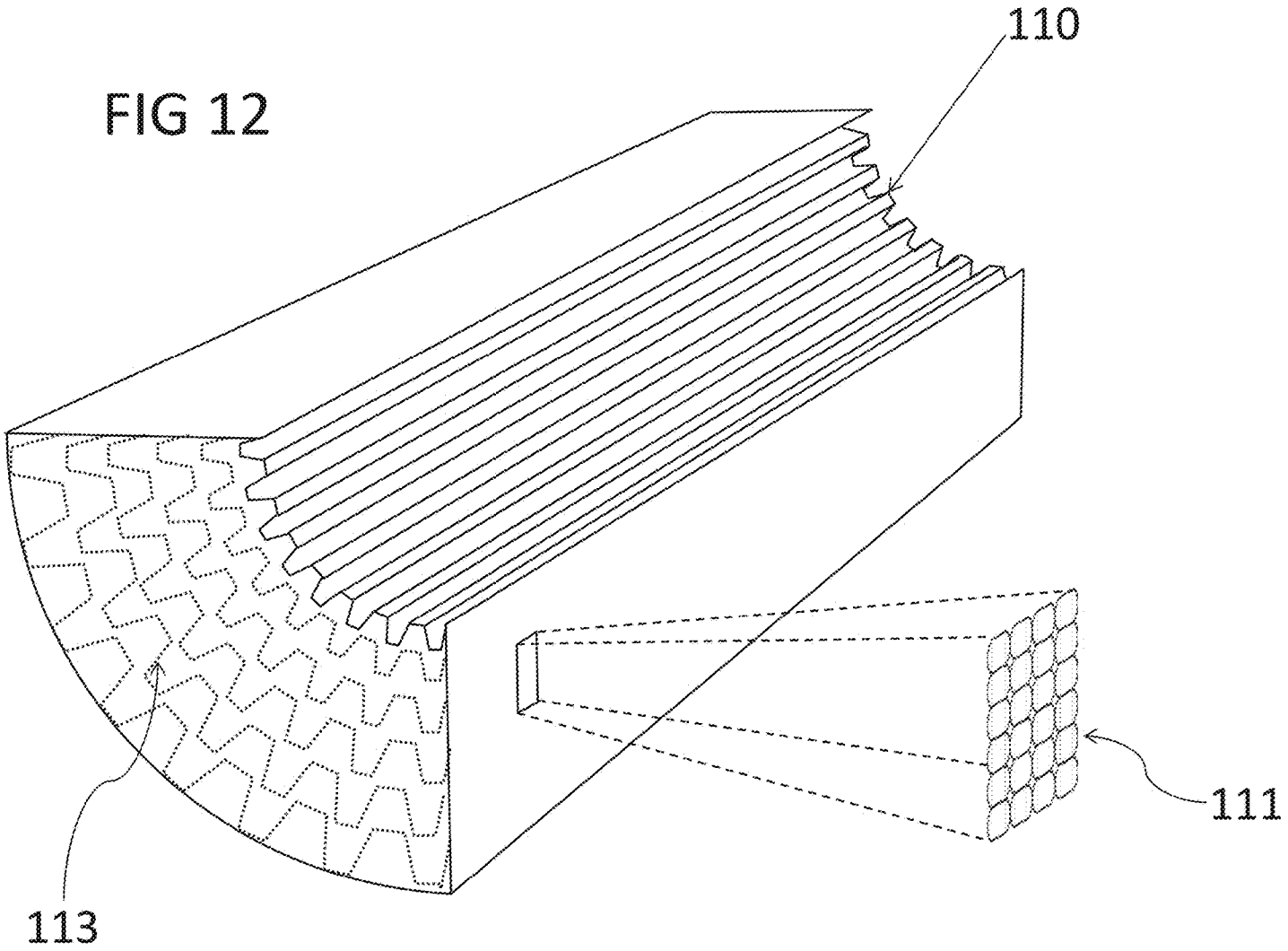
FIGS. 12 and 13 depict quarter sectional views of a fuel grain section featuring a concentric rifled truncated pyramidal topology grain pattern.
Figure 13:
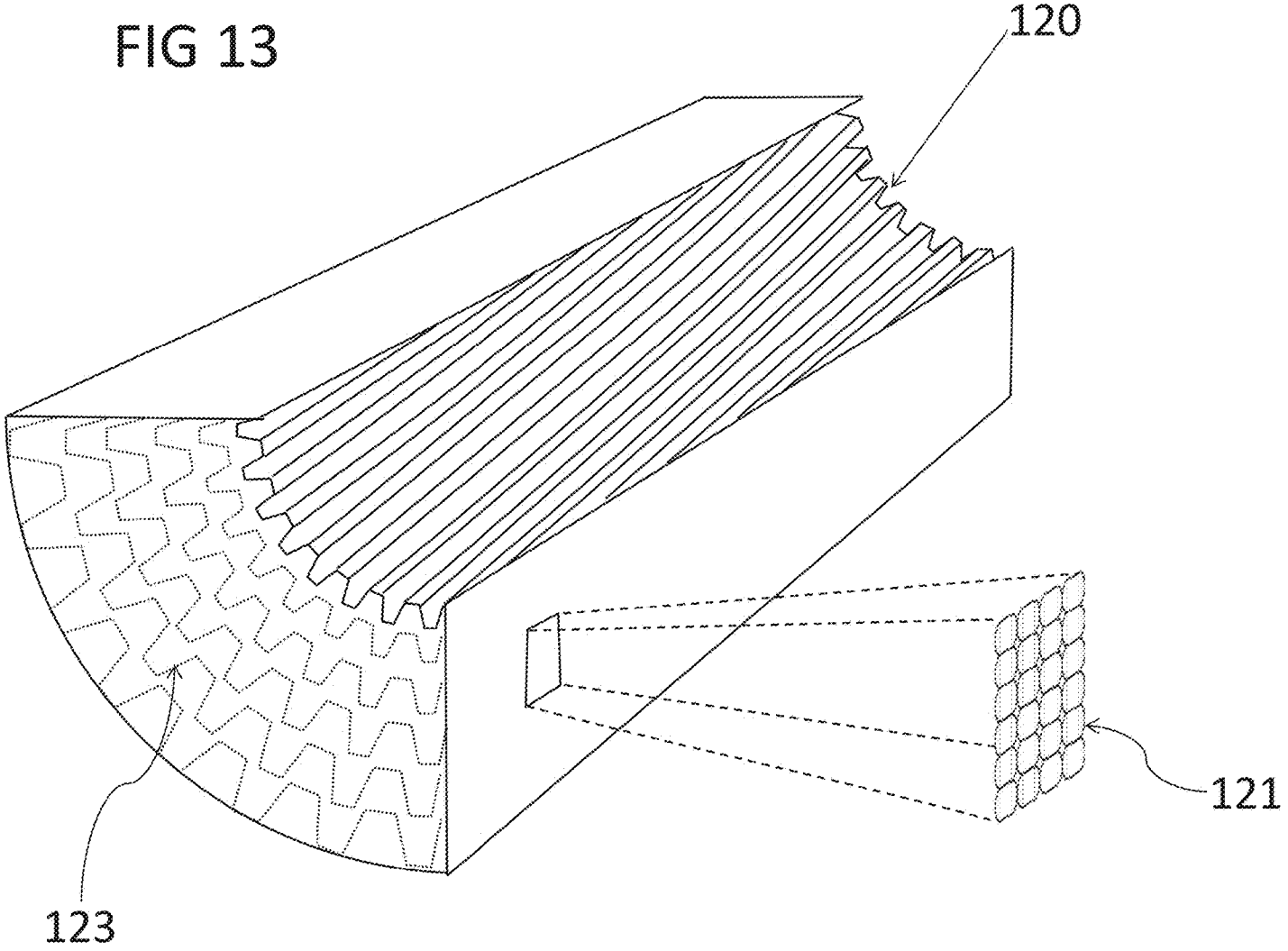
Figures 14A, 14B:
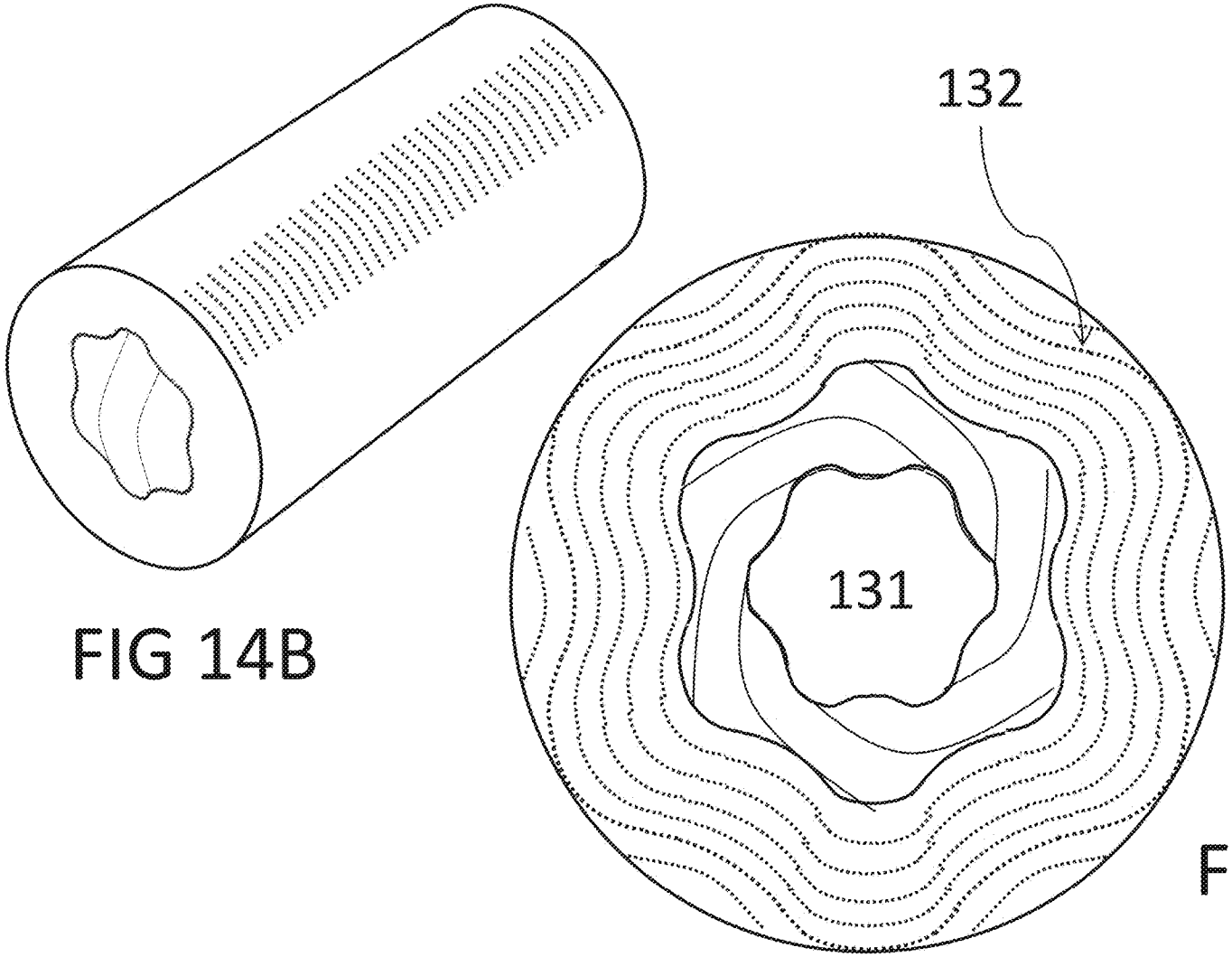
FIGS. 14A and 14B depict a top view and a perspective view of the fuel grain section of FIG. 1 featuring a concentric rifled polygonal topology grain pattern.

In FIGS. 1-3 as well as in FIGS. 11-14B, the individual undulations are identifiable and have a substantially cylindrical shape. However, in practice, depending upon the scale and layer thickness, such internal topology can take the form of a dimple pattern 14 as shown in FIGS. 1-3, a corrugation pattern 92 as shown in FIG. 11, a truncated pyramidal pattern 110 as shown in FIG. 12, a truncated pyramidal pattern 120 as shown in FIG. 13, and an irregular pattern 131 as shown in FIGS. 14A and 14B, all of which may or may not be perceptible to a viewer's unaided eye. Alternatively, the geometric pattern 14, 92, 110, 120, 131 of each ring-shaped concentric beaded structure may take other forms in order to achieve the objective of increasing the surface area available for combustion that persists throughout the hybrid rocket engine's operation.

There are many manufacturers producing distinct models of fused deposition type additive manufacturing machines in use today capable of processing thermoplastic solid fuel and (with the modifications as described below) a compounded formulation of thermoplastic and nanocomposite aluminum additive to fabricate a hybrid rocket engine fuel grain consistent with the present invention.

For the exemplary examples shown in FIGS. 1-3, the fused stacked layers of the solid fuel grain section 10 may be formed on a fused deposition type additive manufacturing machine with sufficient build scale and capability to produce entire fuel grains or sections which can be joined during post-processing. The fused deposition method of 3D printing machine technology, originally developed by Stratasys, Inc., Eden Prairie, Minn., today is considered a generic form and can be found under other trademarked processes such as Fused Filament Fabrication or Plastic Jet Printing. Examples of manufacturers of fused deposition type machines, of sufficient scale, meeting these criteria include: Cincinnati, Inc. of Harrison, Ohio; Stratasys, Inc., of Eden Prairie, Minn.; Cosine Additive, Inc., Houston, Tex.; and Thurmwood Corp., Dale, Ind.

In addition to fused deposition; there are a number of other additive manufacturing methods that can be employed to produce hybrid rocket fuel grains using a formulation of polymer and nanocomposite aluminum additive without departing from the spirit and scope of the present invention, including: Stereolithography, Selective Laser Sintering, Powder Bed Printing, and Inkjet Head Printing.

Figure 15:
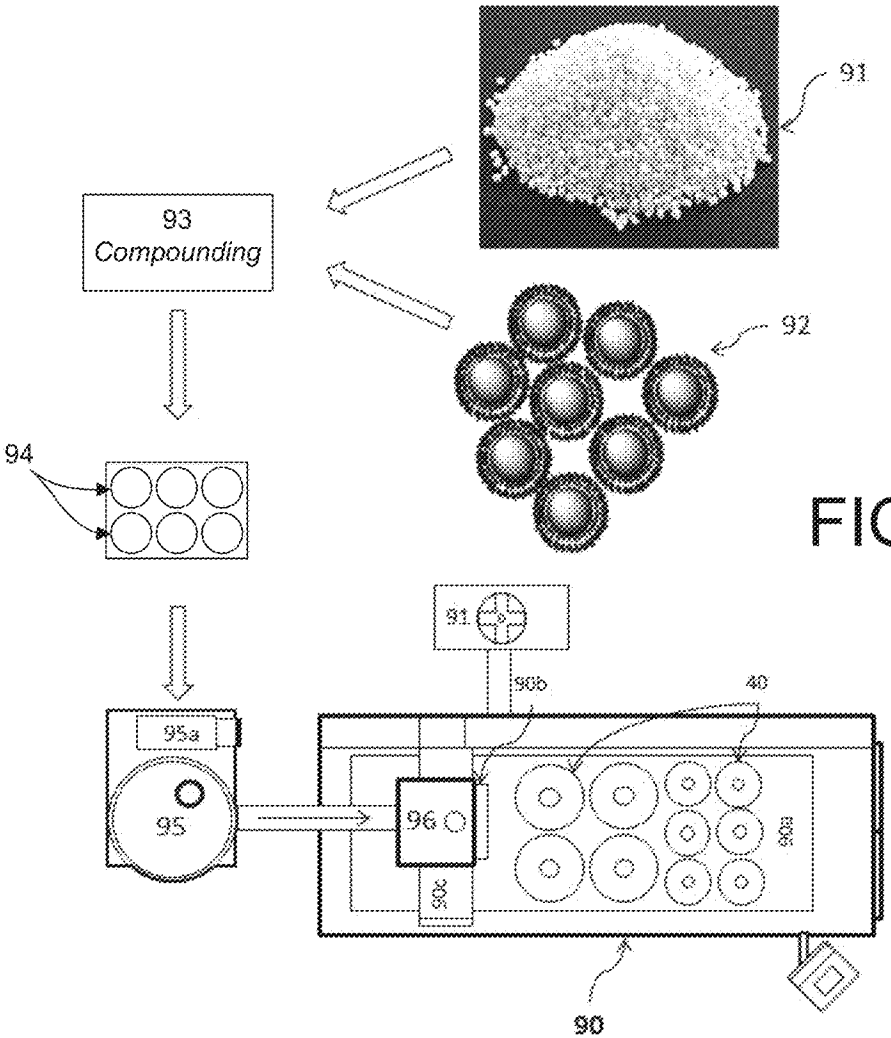
FIG. 15 is a schematic depicting the production steps and equipment involved in the additive manufacture of hybrid rocket fuel grains according to the present invention.

For the examples shown in the various Figures described herein, the fuel grain is fabricated per the flow diagram shown in FIG. 15 in a formulation of 95% by mass Acrylonitrile Butadiene Styrene (ABS), a thermoplastic possessing combustion characteristics desirable for hybrid rocket engine fuel and 5% nanocomposite aluminum. Such fuel having this structure are available from several sources, as known by those skilled in the art.

With a Young's Modulus of 2.0-2.6 GPa, ABS is 460 times less elastic than HTPB and 38 times less elastic than paraffin wax, making it an ideal material for fabricating a hybrid rocket fuel grain and its combustion chamber center port.

Ultra-high energetic nano particle size aluminum, especially aluminum powder produced without an aluminum oxide shell and passivated (by encapsulating or 'capping' the particle in a polymer shell) for safe handling and use, will increase fuel grain burning rate by as much as 50% using only a 5% concentration compared to a fuel grain fabricated in ABS with a 25% concentration of standard military grade 44 micron particle size aluminum.

Figure 4:
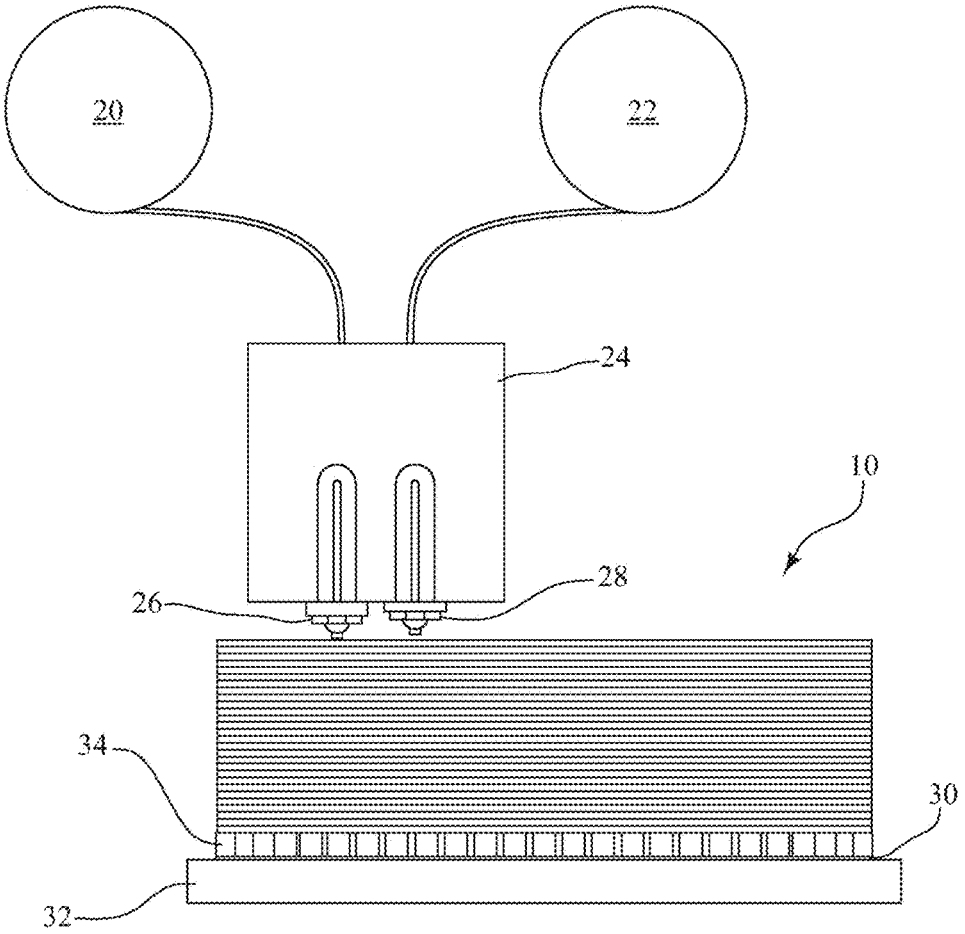
FIG. 4 is a flow diagram of an exemplary method for manufacturing the solid fuel grain section of FIG. 1 using a formulation of thermoplastic fuel and nanocomposite aluminum additive.

Referring now to FIG. 4, in an exemplary method for manufacturing the solid fuel grain section 10, the fused deposition additive manufacturing process is performed in an additive manufacturing machine 10. The machine 10 comprises two cartridge mechanisms 20 and 22. One cartridge 20 stores a spool of ABS thermoplastic, or a compounded formulation of ABS and nanocomposite aluminum additive, that is used for fabricating the solid fuel grain. The second cartridge 22 stores a spool of water-soluble disposable material that is used to separate the solid fuel grain section 10 from a support base and support any overhanging structures specified in the design.

However, other types of additive manufacturing technologies that operate differently may be employed without departing from the spirit of the present invention. For example, the BAAM™, a giant-scale additive manufacturing system produced by Cincinnati, Inc., Harrison, Ohio does not feature a disposable support material. Instead, a solvent sprayer is used to enable easy separation of the fuel grain from its base as well as any overhanging structures that are formed.

Once the additive manufacturing process has commenced, monofilament lines are spooled out from each cartridge 20, 22 and are fed into liquefiers (not shown) housed in a module 24, with the liquefiers heating the monofilament lines to their respective melting temperatures. The resulting liquefied ABS thermoplastic and support material is then forced through respective injection nozzles 26, 28 housed in the same module 24, so as to form small diameter concentric ring-shaped beads of material that are disposed upon the support base, in this example, a substantially flat plastic sheet 30.

In this regard, the module 24 housing the liquefiers and respective injection nozzles 26, 28 is robotically-controlled to allow for movement along two axes (X, Y) in a plane substantially parallel to the underlying plastic sheet 30. The plastic sheet 30 is mounted to a robotically-controlled elevator platform 32 that moves along an axis (Z) substantially perpendicular to the module 24 housing the liquefiers and respective injection nozzles 26, 28. Thus, the elevator platform 32 can drop a distance equal to the specified layer thickness after each successive layer has been formed.

Thus, the ABS thermoplastic or compounded ABS-nanocomposite aluminum material is extruded and placed to form each successive layer of concentric fused ring-shaped beaded structures according to the chosen design of the solid fuel grain section 10, with each successive layer being extruded and disposed upon the preceding layer. As each ring-shaped beaded structure cools and solidifies, a fusion bond develops between the concentric ring-shaped beaded structure, and as each plurality of such ring-shaped beaded structures forming layers cool and solidify, likewise a fusion bond develops between the layers.

Once the solid fuel grain section 10 is additively manufactured in this manner, and removed from the fused deposition additive manufacturing machine, any build support materials 34 can be either physically removed, or depending on the specific system employed, the fuel grain section can also be submersed into a water solution to dissolve any build support material.

The additively manufactured solid fuel grain section 10 has a substantially uniform fuel grain density and is substantially free of voids. Furthermore, hybrid rocket fuel grains produced in this manner will normally require only minimal post-processing surface treatment. It is important to note that many additive manufacturing systems capable of producing hybrid rocket fuel grains consistent with the spirit and scope of the present invention employ different means to additively manufacture solid articles. For example, instead of using line filament, the Cincinnati BAAM uses thermoplastic feedstock in pellet form, similar to those used in injection molding. Stereolithography employs a bath of liquid photo curable polymer and a UV laser to trace the tool path on its surface to cause the material to solidify. Other additive manufacturing systems such as Selective Laser Sintering use a powder bed approach in which a fine layer of polymer powder is laid down to which a hot laser traces the tool path to solidify the material.

Figure 5A:
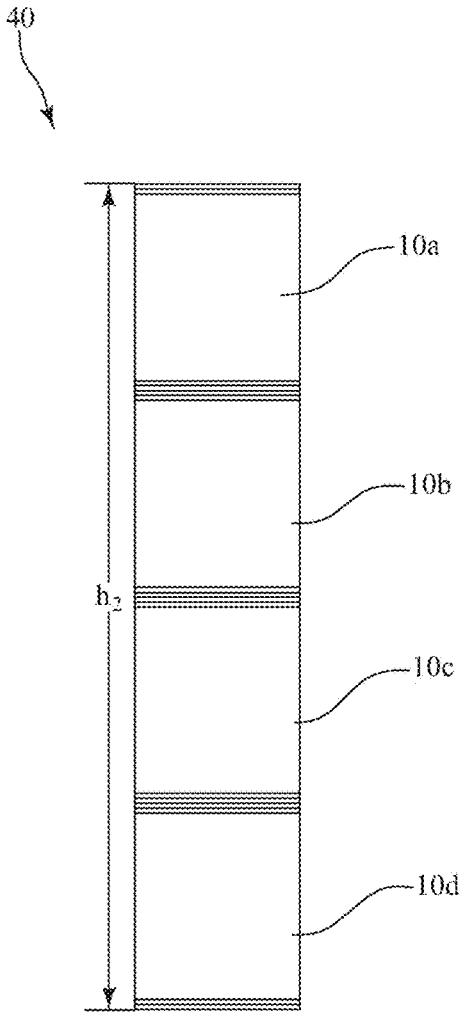
FIG. 5A is a side view of a solid fuel grain comprised of a plurality of solid fuel grain sections.
Figure 5B:
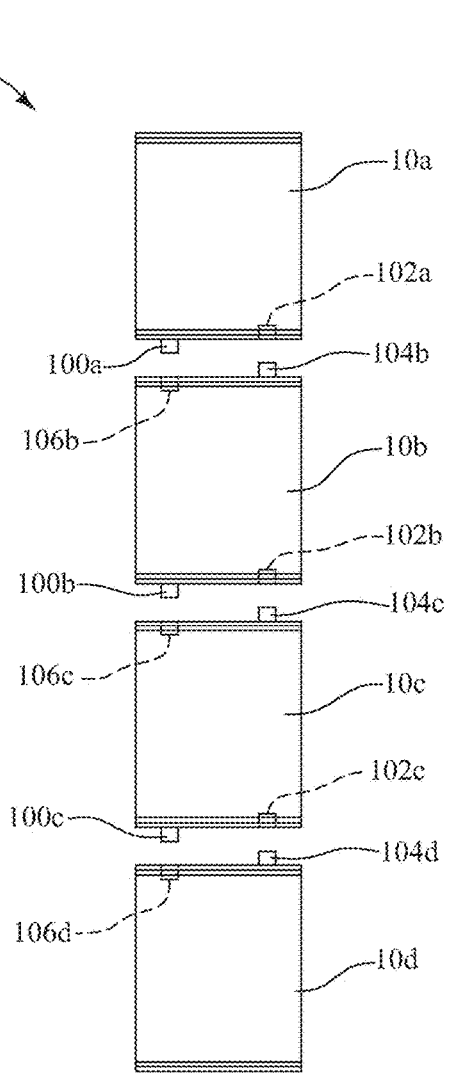
FIG. 5B is an exploded side view of the solid fuel grain of FIG. 5A.

Referring now to FIGS. 5A-5B, the individual fuel grain sections 10a, 10b, 10c, and 10d can be assembled and joined together from multiple separately fabricated sections to form a complete solid fuel grain 40. In this exemplary embodiment, each solid fuel grain section 10 has a height, h1, of 23 inches, such that the overall height, h2, of the complete solid fuel grain 40 is 92 inches. Furthermore, in this exemplary embodiment, to ensure proper alignment, the topmost solid fuel grain 10a has at least one connecting member 100a extending from its lower surface and at least one cavity 102a defined in its lower surface for receiving a mating connecting member 104b. Similarly, the intermediate solid fuel grain sections 10b, 10c, each have at least one connecting member 100b and 100c, extending from their respective lower surfaces and one connecting member 104b, 104c, extending from their respective upper surfaces, and further each have at least one cavity 102b, 102c defined in their respective lower surfaces and at least one cavity 106b, 106c defined in their respective upper surfaces. Finally, the lowermost solid fuel grain section 10d has at least one connecting member 104b extending from its upper surface and at least one cavity 106d defined in its upper surface for receiving a mating connecting member 100c in the fuel grain section 10c.

Accordingly, when heated above its glass transition temperature but below the nanocomposite aluminum's ignition temperature, viscous ABS can be spread or sprayed on the upper and lower surfaces to create a strong fusion bond between the sections 10a, 10b, 10c, 10d during assembly. In this way, solid fuel grain sections 10a, 10b, 10c, 10d can be readily stacked, aligned, and mated to one another to form the complete solid fuel grain 40.

Figure 6:
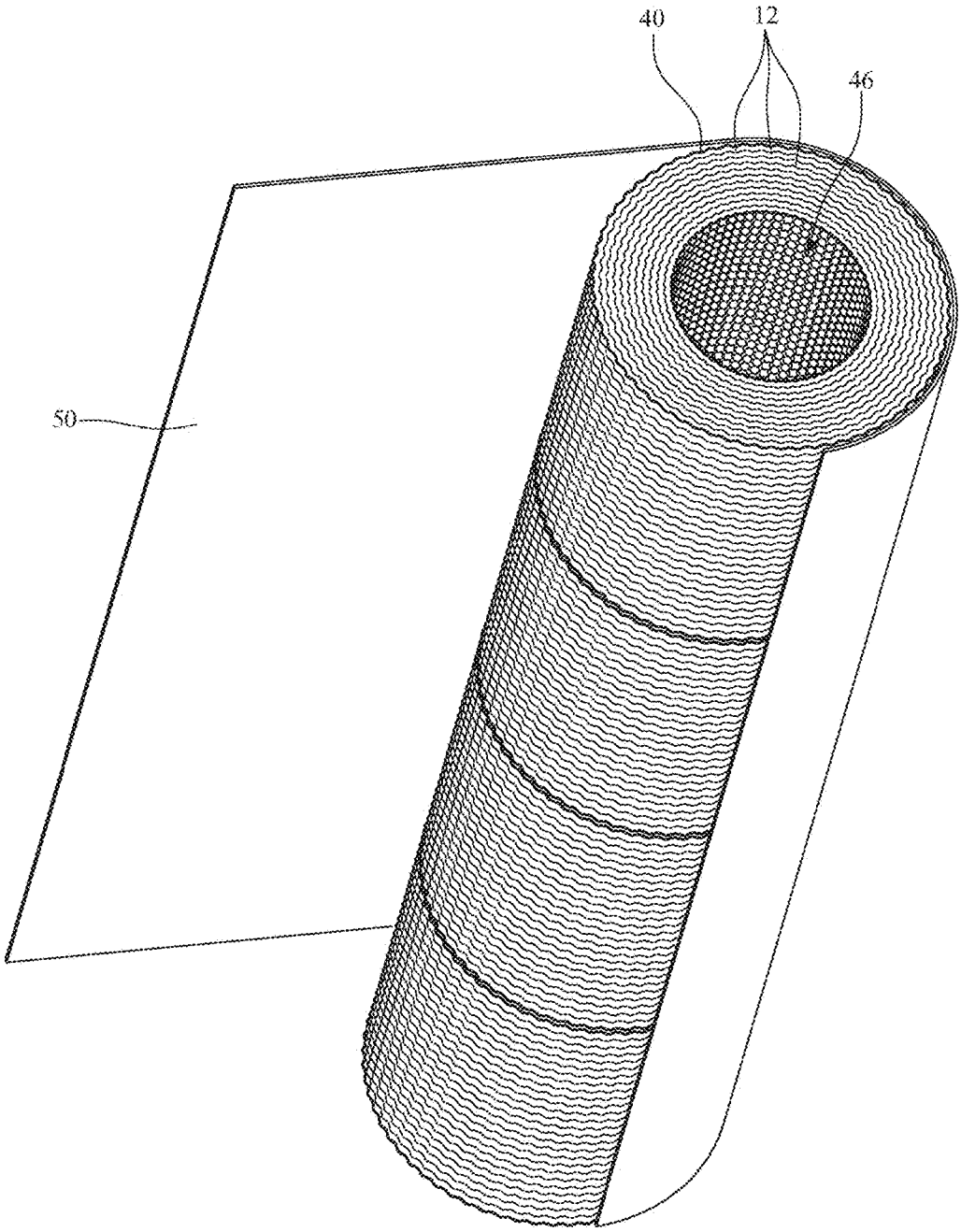
FIG. 6 is a perspective view of the plurality of solid fuel grain sections of FIG. 5A wrapped with insulating film.

Referring now to FIG. 6, after the solid fuel grain sections 10a, 10b, 10c, 10d are assembled, the solid fuel grain sections 10a, 10b, 10c, 10d collectively define a center port 46 through the solid fuel grain 40. The solid fuel grain 40 is preferably wrapped in a film 50 made of phenol or other suitable thermally resistant material. Placed between the inner wall of a fuel motor case (not shown in FIG. 6) and the outer surface of the solid fuel grain, the film 50 acts as an insulation layer to reflect heat and prevent damage to fuel motor cases made from either metal or non-metallic materials such as carbon fiber reinforced polymer composite. Once wrapped in the film 50, the solid fuel grain 40 can be placed into a motor case of a rocket.

Figure 7:
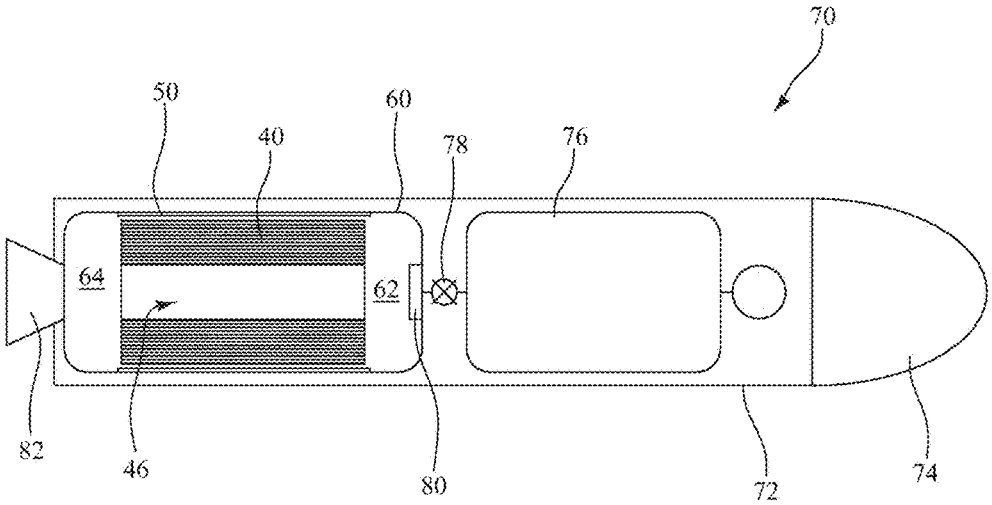
FIG. 7 is a sectional view of an exemplary rocket incorporating the solid fuel grain of FIGS. 5A, 5B, and 6.

FIG. 7 is a sectional view of an exemplary hybrid rocket engine 70 housed within an aeroshell 72 to form a complete hybrid rocket powered vehicle 70 incorporating the solid fuel grain 40 as described above with respect to FIGS. 5A, 5B, and 6. The exemplary hybrid rocket powered vehicle 70 generally comprises an aeroshell body 72, a nozzle 82 at one distal end of said aeroshell body 72, and a payload section 74 at an opposite distal end of said aeroshell body 72. Enclosed within the aeroshell body 72 of the hybrid rocket powered vehicle 70 is a hybrid rocket engine including an oxidizer tank 76, a valve 78, a motor case 60, and an oxidizer injector 80 housed typically within a forward cap (not shown) that also houses the ignition system (not shown). The motor case 60 houses a pre-combustion chamber (not shown), a post-combustion chamber 64, and the solid fuel grain 40, which as described above is wrapped in insulating film 50.

The solid fuel grain 40 wrapped in insulating film 50 can be "cartridge loaded" into the motor case 60 of the hybrid rocket engine. Alternatively, the exemplary solid fuel grain 40 wrapped in insulating film 50 could be wound with a fiber-reinforced polymer composite to form the motor case without departing from the spirit and scope of the present invention. In another exemplary embodiment, the solid fuel grain 40 can be inserted into a thermal protection cylinder fabricated from insulating material such as phenolic or cork without departing from the spirit and scope of the present invention. In yet another exemplary embodiment, the fuel grain 40 can be formed to embody either or both the pre-combustion chamber and the post-combustion chamber 64 without departing from the spirit and scope of the present invention.

Figure 8:
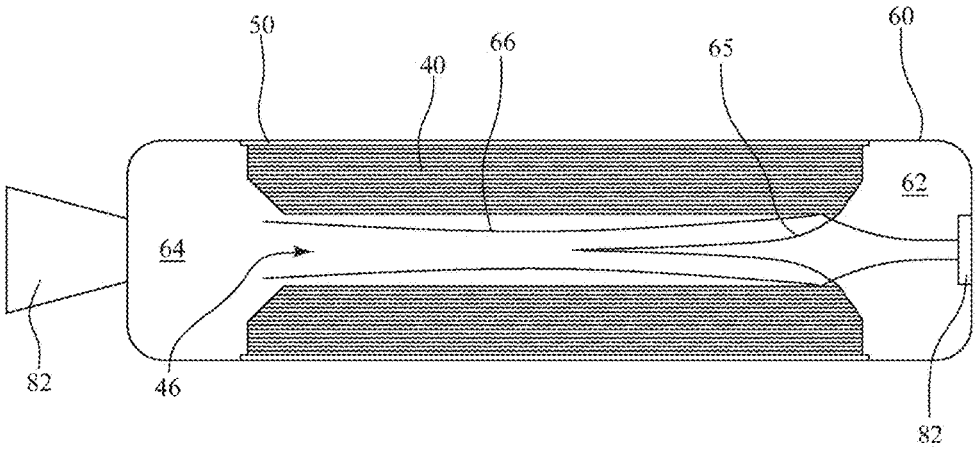
FIG. 8 is an enlarged sectional view of the motor case of the rocket of FIG. 7, showing a flame configuration.

FIG. 8 is an enlarged sectional view of the motor case 60 of the hybrid rocket powered vehicle 70 of FIG. 7, showing the flame zone within the fuel grain center port 46. As shown, an oxidizer 94 (either a liquid or a gas) is injected into the motor case 60 along a pathway defined by the center port 46 of the solid fuel grain 40 and flows within the center port 46, forming a boundary layer 65 bordered by the center port 46 wall. The boundary layer 65 is usually turbulent throughout a large portion of the length of the center port 46. Within the boundary layer 65 is a turbulent diffusion flame zone 66 that extends throughout the entire length of the center port 46 and depending upon the characteristics of the solid fuel selected, either causing a phase change to a gas or entrained liquid droplets of fuel to form. Evaporation from the oxidizer/fuel gas/entrained liquid droplet interface produces a continuous flow of fuel gas that mixes with oxidizer gas at the flame zone 66 to maintain combustion along the exposed surface area of the center port 46 wall. At steady state, the regression rate of the melt surface and the gas-gas or gas-entrained liquid droplet interface is the same, and the thickness of the gaseous or entrained liquid layer is constant.

Figure 9A:
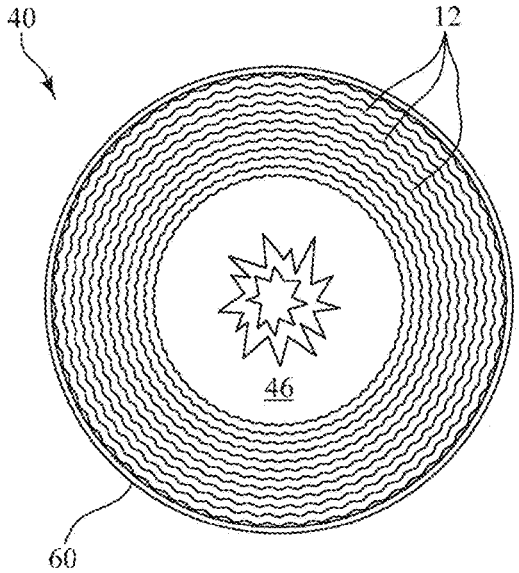
FIGS. 9A, 9B, and 9C are top views of the fuel grain section of FIG. 1 as successively consumed by a flame.
Figure 9B:
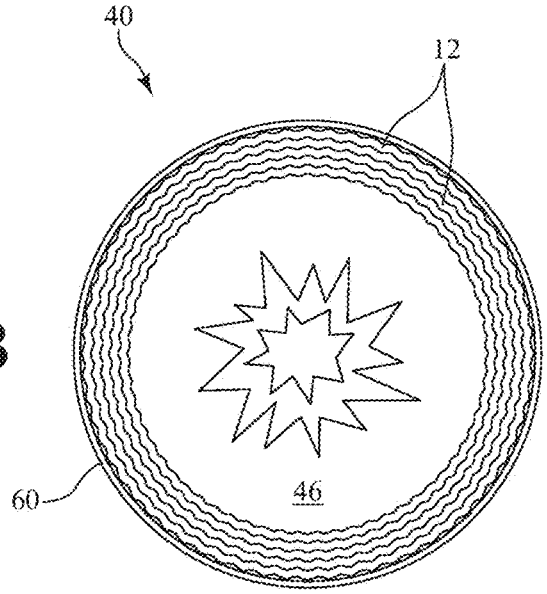
Figure 9C:
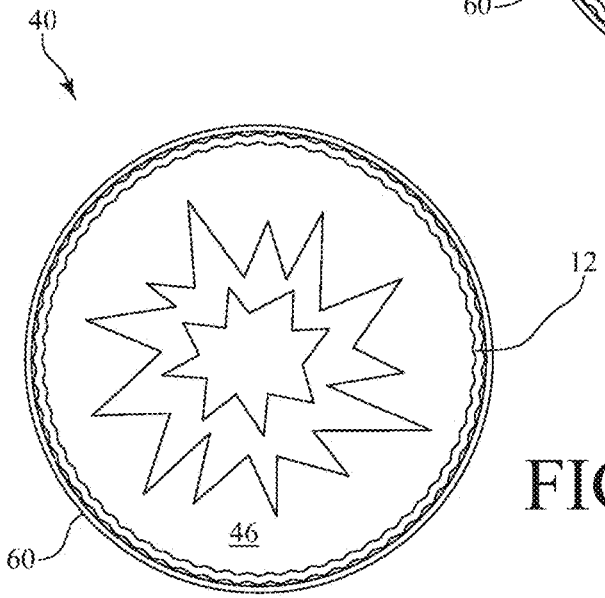

Because the additively manufactured port wall surface pattern 14, 91 exposed to the flame zone 66 possesses increased surface area compared to cast-molded constructions, the exemplary solid fuel grain 40 causes increased regression rate and corresponding increased thrust impulse without the decreased fuel volumes associated with multi-port designs. Also, unlike the prior art constructions that increase the surface area through a multi-port architecture at the sacrifice of fuel loading, the solid fuel grain 40 of the present invention allows a smooth burning process whereby, as each concentric ring-shaped beaded structure forming each layer of the fusion stacked layer center port 46 wall is ablated, a new concentric ring-shaped beaded structure, the plurality of which forms the expanded center port 46 wall is presented to the flame zone 66, as shown in FIGS. 9A-9C, illustrating ablation of the center port wall at three different stages. This burning process continues until either oxidizer flow is terminated or the solid fuel grain 40 material is exhausted.

FIG. 15 is a schematic drawing depicting the production steps and equipment involved in the additive manufacture of hybrid rocket fuel grains 40 made from a compounded formulation of ABS thermoplastic and highly-energetic polymer-capped nanocomposite aluminum. Generally, energetic materials are a class of material with high amount of stored chemical energy that can be released. Highly energetic materials include ultrafine aluminum powder, the particle size of which is in nanoscale. As shown in this exemplary example, ABS thermoplastic 91 is compounded with polymer capped nanocomposite aluminum particles 92 to a desired mixture ratio. As known by those skilled in the art, generally a nanocomposite is a material comprising two or more constituent solids, the size of which measures 100 nanometers (nm) or less. Even though the nano-scale aluminum particle cores 92a are completely encapsulated in a polymer based oligomer coating 92b, and thus passivated, there remains the possibility that this highly energetic pyrophoric material can still be reactive with oxygen or water vapor. As a safety precaution, the nanocomposite aluminum, the ABS thermoplastic, and the compounded ABS-nanocomposite materials (i.e., the feedstock to the additive manufacturing apparatus 90) are stored in containers designed to store flammable material 94, preferably infilled with a non-reactive noble gas at all times prior to their use as feedstock in an additive manufacturing process.

In one application, the compounded feedstock is stored within a climate controlled environment near the additive manufacturing apparatus 90.

According to one embodiment of the invention, during the fabrication process a heavier-than-air shielding gas is used to prevent trapping of atmospheric air within the fuel gain during 3D printing. Air trapped in the voids between beaded extrusions and between layers (can range from 5% to 15% depending upon the additive manufacturing apparatus used) is not a problem for fuel grains made from thermoplastic or even when non-pyrophoric micron scale particle size aluminum is added to the formulation. However, atmospheric air (containing approximately 20% oxygen and varying amounts of water vapor, both of which are highly reactive with uncapped nanoscale aluminum particles) entrapped in a fuel grain containing nanocomposite aluminum could present a fire hazard due to the pyrophoric nature of the material should the polymer caps insulating the elemental aluminum core become compromised during production.

Thus, a pure heavier-than-air gas, such as argon, carbon dioxide, or nitrogen dioxide that is non-reactive to nanoscale elemental aluminum particle cores is used to cover the print bed and extruder during 3D printing as an added safety measure, particularly when the shielding gas is kept at a lower temperature to aide in the solidification process.

Given that the gas trapped in the voids will react when combusted within the rocket engine, the shielding gas should ideally contribute to combustion, or at minimum, be inert. For example, carbon dioxide will contribute oxygen to the combustion reaction whereas, argon being an inert noble gas will not.

According to another embodiment, a heavier-than-air inert or non-nanocomposite aluminum reactive gas covers a print bed and an extruder of the additive manufacturing apparatus during fabrication. In yet another embodiment, the printer is configured such that the print bed is fully enclosed and sealed, and an inert non-heavier-than-air gas, such as nitrogen, infills the print bed chamber.

As a further safety measure, each 3D printed fuel grain or fuel grain section is shrink-wrapped to encase the fuel grain or fuel grain sections in a thin plastic film to prevent atmospheric exposure prior to its use in a hybrid rocket engine. In another embodiment the fuel grain is spray coated with a polymeric material or paint that serves to prevent atmospheric exposure. According to another embodiment the fuel grain or grain segment is inserted into an air-tight packaging cylinder and a vacuum drawn to remove all air. The packaging cylinder is sealed before it is removed from the print bed chamber.

In one embodiment a gantry-type fused deposition additive manufacturing system like the Cincinnati BAAM is used to 3D print hybrid rocket fuel grains 40 on the print bed 90a as shown. The ABS/nAl feedstock 94 is batch-fed into the argon gas filled dryer unit 95 to remove any remaining water vapor from the feedstock. The now completely dried ABS/nAl feedstock 94 is manually poured into the argon filled Gaylord box 95a within the dryer 95, which in turn through piping, pneumatically feeds the material into the additive manufacturing apparatus's extruder 90b which is mounted on a moveable gantry 90c over the print bed 90a. The ABS/nAl feedstock 94 is pneumatically urged into and through the extruder 90b which contains a screw-drive unit which grinds the material, and using the friction heat created, elevates the material's temperature to achieve the desired viscosity.

The viscous ABS/nAl feedstock is then urged into and through a die which deposes a bead of semi-solid material upon either the print bed 90a or the proceeding layer of the fuel grain being 3D printed, whichever is the case. As depicted, multiple fuel grains 40 of two different dimensions are being 3D printed simultaneously on the print bed 90a.

Care must be taken to ensure that during compounding as well as during additive manufacturing that the polymer capping material which encapsulates the nanocomposite aluminum is not subjected temperatures elevated above its heat deflection or melting temperature, nor the ignition temperature of the nano-scale aluminum particle core.

Figure 10:
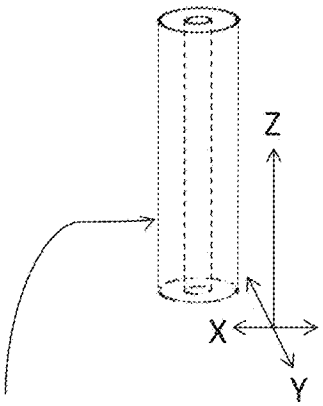
FIG. 10 depicts the coordinate system and orientation of the fuel grain for use with FIGS. 11-14.

FIG. 10 depicts the coordinate system and orientation of the fuel grain for use with FIGS. 11-14 and depicts a preferred build orientation within the FDM additive manufacturing machine for fuel grains 93 (FIG. 11), 112 (FIG. 12), 122 (FIGS. 13), and 133 (FIG. 14).

FIG. 11 is a quarter sectional view of the fuel grain section of FIG. 1 featuring a concentric ring-shaped corrugation build pattern or fuel grain 92, a port wall surface pattern 91, and several layers of fused concentric beads in cross section 90.

FIG. 12 is a quarter sectional view of the fuel grain section of FIG. 1 featuring a concentric ring-shaped truncated pyramidal build pattern or fuel grain 113, a port wall surface pattern 110, and several layers of fused concentric beads in cross section 111.

FIG. 13 is a quarter sectional view of the fuel grain section of FIG. 1 featuring a concentric ring-shaped rifled truncated pyramidal build pattern or fuel grain 123, a port wall surface pattern 120 with the build and surface patterns staggered layer by layer to form in its plurality a persistent rifling pattern.

FIG. 14A depicts a top view and FIG. 14B a perspective view showing the port wall surface pattern 131 of the fuel grain section of FIG. 1. FIGS. 14A and 14B feature a concentric ring-shaped rifled polygonal build pattern or fuel grain 132 with each such polygonal build pattern staggered and twisted (i.e., rifled) layer-by-layer to form in its plurality a persistent rifling pattern.

The embodiments of FIGS. 12-14B depict exemplary constructions of a hybrid rocket fuel grain engineered and additively manufactured to both increase the amount of surface area available for combustion as a means to improve regression rate, to improve specific impulse, to generate an oxidizer vortex flow, and to reduce fuel waste by inducing oxidizer axial flow within the center port 46 (see FIG. 8) to allow more time for oxidizer and fuel gases (or oxidizer and entrained liquid droplets) to mix and combust more thoroughly. Any surface area pattern or topology that furthers one or more of these objectives, and is sustainable throughout the fuel grain cross-section (i.e., as one fuel grain layer ablates the next fuel grain layer presents a desirable surface area pattern) is considered within the scope of the present invention.

The embodiments of FIGS. 13 and 14A/14B present a persistent rifling pattern to the oxidizer flowing through the center port 46 to induce axial flow.

A person of art in the field will recognize that the fused deposition type additive manufacturing apparatuses currently commercially produced and distributed are designed to employ material feedstock in two basic forms: line filament or pellet. Those like the Cincinnati BAAM designed to process feedstock in pellet form are also capable of processing feedstock material in granule form, provided, the granules are of a small enough size to flow like sand under gravity into the machine's extruder.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

[1. A method of making a fuel grain for use in a hybrid rocket engine, the method comprising:

compounding a first material suitable as a hybrid rocket fuel and a second energetic and pyrophoric nanoscale metallic material according to a predetermined mixture ratio to form a third material;

the third material serving as feedstock material for use in an additive manufacturing apparatus;

operating the additive manufacturing apparatus using the feedstock material to fabricate a fuel grain comprising a plurality of fused stacked layers of solidified fuel grain material;

each layer of the plurality of fused stacked layers further comprising a plurality of abutting and fused ring-shaped beads concentrically configured to form a central opening in each layer;

the central opening extending through the plurality of fused stacked layers to define a combustion port bounded by a boundary wall; and an inner circumferential surface of each ring-shaped bead defining projections therein, such that as a ring-shaped bead forming the boundary wall ablates due to combustion in the combustion port, an inner circumferential wall of an adjacent ring-shaped bead defining projections therein presents to form the boundary wall of the combustion port.]

[2. The method of claim 1 the projections in the inner circumference of each ring-shaped bead configured to form a progressive axial twist through the combustion port to induce a swirling gaseous flow within the combustion port.]

[3. The method of claim 2 wherein the progressive twist comprises a helical grooved rifling pattern of projections.]

[4. The method of claim 1 the projections in the inner circumference of each ring-shaped bead configured to increase a surface area of the combustion port or to induce an oxidizer vortex flow within the combustion port.]

[5. The method of claim 1 wherein the additive manufacturing apparatus comprises a fused deposition additive manufacturing apparatus.]

[6. The method of claim 1 further comprising drying the feedstock material and then elevating a temperature of the feedstock material to attain a predetermined viscosity for the feedstock material.]

[7. The method of claim 6 wherein the step of elevating the temperature further comprises processing the feedstock material to increase internal friction and thereby elevate the temperature of the feedstock material to achieve the predetermined viscosity for deposition during the step of operating.]

[8. The method of claim 1 the step of operating comprising urging the feedstock material through an extrusion die of a predetermined diameter to fabricate the plurality of fused stack of layers of solidified fuel grain material.]

[9. The method of claim 1 wherein the first material comprises Acrylonitrile Butadiene Styrene (ABS) thermoplastic having a predetermined monomer composition.]

[10. The method of claim 1 wherein the second material comprises a plurality of nanoscale elemental aluminum core particles capped with an oligomer polymer or the second material comprises polymer-capped nanocomposite aluminum powder.]

[11. The method of claim 1 wherein the first material comprises ABS thermoplastic and the second material comprises polymer-capped nanocomposite aluminum powder, the third material comprising ABS thermoplastic by mass of about 75% to 95% and polymer-capped nanocomposite aluminum powder by corresponding mass of about 25% to 5%.]

[12. The method of claim 1 wherein a heavier-than-air inert or non-nanocomposite aluminum reactive gas covers a print bed and an extruder of the additive manufacturing apparatus during a step of operating.]

[13. The method of claim 12 wherein the heavier-than-air inert gas comprises argon, carbon dioxide, nitrogen, or nitrogen dioxide.]

[14. The method of claim 12 wherein a temperature of the heavier-than-air inert gas is maintained at a value below a temperature of the additive manufacturing apparatus during a step of operating.]

[15. The method of claim 1 further comprising storing the second material in an inert atmosphere for transporting, handling, and compounding with the first material, and storing the third material in an inert atmosphere prior to using the third material as the feedstock material during the step of operating.]

[16. The method of claim 1 further comprising during the step of operating, maintaining a temperature of the second material below a gas transition temperature, melting temperature, and ignition temperature of the second material.]

[17. The method of claim 1 further comprising encasing the fuel grain within an insulating material.]

[18. The method of claim 1 the projections comprising one or more of a plurality of ribs, a plurality of undulations, a plurality of protrusions and recessions, and a plurality of depressions.]

[19. The method of claim 1 wherein the combustion port defines a substantially circular cross-section.]

[20. The method of claim 1 wherein a shape of the combustion port comprises an oval shape, a polygonal shape, a quatrefoil shape, a star shape, or an irregular shape.]

[21. The method of claim 1 wherein the fuel grain defines an outer diameter of about 19.0 inches and the center combustion port has an initial diameter of about 4 inches prior to consumption of the fuel grain material during a combustion process.]

[22. Forming a fuel grain segment having a plurality of stacked fuel grains according to the method of claim 1, further comprising disposing viscous ABS material between a surface of a first fuel grain segment and an abutting surface of a second fuel grain segment to create a fusion bond between the first and second fuel grain segments.]

[23. The method of claim 1 wherein each one of the plurality of fused stacked layers is substantially uniform in material composition.]

[24. The method of claim 1 further comprising insulating the fuel grain from an ambient atmosphere prior to removing the fuel grain from a print bed of the additive manufacturing apparatus.]

[25. A method for constructing a rocket motor comprising:

compounding a first material suitable as a hybrid rocket fuel and a second energetic and pyrophoric nanoscale metallic material according to a predetermined mixture ratio to form a third material;

the third material serving as feedstock material for use in an additive manufacturing apparatus;

operating the additive manufacturing apparatus using the feedstock material to fabricate a fuel grain comprising a plurality of fused stacked layers of solidified fuel grain material;

each layer comprising a plurality of abutting and fused ring-shaped beads concentrically configured to form a central opening in each layer the central opening extending through the plurality of fused stacked layers to form a combustion port;

as an inner circumference of a ring-shaped bead forming a boundary of the combustion port ablates due to combustion in the combustion port, an inner circumference of an adjacent ring-shaped bead presents to form the boundary of the combustion port;

the inner circumference of each ring-shaped bead presenting irregular surface features;

the irregular surface features presenting a larger surface area for combustion and therefore an increased regression rate of the fuel grain relative to an inner surface presenting a smooth surface; and connecting the fuel grain to a rocket nozzle.]

[26. The method of claim 25 wherein the irregular surface comprises projections, the projections forming a progressive twist through the combustion port to induce a swirling gaseous flow within the combustion port.]

[27. A method of making a fuel grain for use in a hybrid rocket engine, the method comprising:

compounding a first material suitable as a hybrid rocket fuel and a second energetic and pyrophoric nanoscale metallic material according to a predetermined mixture ratio to form a third material;

the third material serving as feedstock material for use in an additive manufacturing apparatus;

operating the additive manufacturing apparatus using the feedstock material to fabricate a fuel grain comprising a plurality of fused stacked layers of solidified fuel grain material;

each layer comprising a plurality of abutting and fused ring-shaped beads concentrically configured to form a central opening in each layer;

the central opening extending through the plurality of fused stacked layers to form a combustion port;

an inner circumference of each ring-shaped bead in a layer defining a sustaining material pattern such that as a first ring-shaped bead forming a boundary of the combustion port ablates a second ring-shaped bead presents to form the boundary of the combustion port, the second ring-shaped bead and each subsequent ring-shaped bead presenting a sustaining material pattern in its inner circumference, wherein the sustaining material pattern in the inner circumference of each of the ring-shaped beads comprises an irregular surface thereby presenting a greater surface area than an inner circumference having a smooth surface, or the inner circumference of each of the ring-shaped beads generating a vortex flow for an oxidizer flowing through the combustion port.]

[28. The method of claim 27 wherein the irregular surface comprises one or more of a plurality of ribs, a plurality of undulations, a plurality of protrusions and recessions, a plurality of depressions, and a plurality of projections.]

[29. The method of claim 27 wherein a same sustaining material pattern is presented in each ring-shaped bead.]

[30. The method of claim 27 wherein the material pattern exhibits a progressive twist through the combustion port to induce a swirling gaseous flow within the combustion port.]

*31. A fuel grain for a hybrid rocket engine, the fuel grain comprising:*

*multiple beads of fuel grain material, in which the fuel grain material comprises a mixture of a hybrid rocket fuel material and a nanoscale metallic material, each bead comprising a combustible substance, wherein the multiple beads are disposed adjacent to one another and bonded together to form a generally cylindrical fuel grain;*

*in which the fuel grain has an inner wall that defines a combustion port extending axially through the fuel grain,*

*in which the inner wall of the fuel grain is textured.*

*32. The fuel grain of claim 31, in which the inner wall of the fuel grain is composed of beads of the fuel grain material.*

*33. The fuel grain of claim 31, in which beads of fuel grain material form layers of fuel grain material.*

*34. The fuel grain of claim 31, in which the inner wall of the fuel grain is textured with ribs.*

*35. The fuel grain of claim 31, in which the inner wall of the fuel grain is textured with one or more of dimples, undulations, protrusions, or depressions.*

*36. The fuel grain of claim 31, in which when viewed along a longitudinal axis of the combustion port, the inner wall of the fuel grain defines alternating protrusions and depressions.*

*37. The fuel grain of claim 31, in which the inner wall of the fuel grain is textured with one or more of a corrugation pattern, a truncated pyramidal pattern, or a polygonal pattern.*

*38. The fuel grain of claim 31, in which the texture of the inner wall of the fuel grain is configured to create a swirling current of oxidizer flowing through the combustion port during operation of the hybrid rocket.*

*39. The fuel grain of claim 31, in which the fuel grain is configured such that when the inner wall of the fuel grain ablates due to combustion in the combustion port, a new textured surface of the fuel grain is exposed to the combustion port.*

*40. A fuel grain assembly comprising:*

*multiple of the fuel grains of claim 31,*

*in which an end of fuel grain is bonded to an end of an adjacent fuel grain to form an elongated, generally cylindrical fuel grain assembly, and in which the combustion ports of the multiple fuel grains are aligned to define an elongated combustion port of the fuel grain assembly.*

*41. The fuel grain of claim 31, in which the fuel grain is fabricated in a freeform fabrication process.*

*42. The fuel grain of claim 31, in which the beads are fabricated in an extrusion process.*

*43. The fuel grain of claim 31, in which the fuel grain material comprises an Acrylonitrile Butadiene Styrene (ABS) thermoplastic.*

*44. The fuel grain of claim 31, in which the nanoscale metallic material comprises nanocomposite aluminum powder or nanoscale aluminum particles.*

*45. The fuel grain of claim 44, in which the nanoscale metallic material comprises nanocomposite aluminum powder or nanoscale aluminum particles passivated with a polymer.*

*46. The fuel grain of claim 31, in which the fuel grain material comprises between 75% and 95% by mass of the hybrid rocket fuel material and between 5% and 25% by mass of the nanoscale metallic material.*

*47. The fuel grain of claim 31, in which the combustion port has a cross-sectional shape that is a circle, oval, ellipse, polygon, quatrefoil, or star.*

*48. The fuel grain of claim 31, comprising a thermally insulating material encasing the fuel grain.*

*49. A hybrid rocket engine comprising:*

*the fuel grain of claim 31;*

*an oxidizer source configured to provide a flow of an oxidizer through the combustion port during operation of the hybrid rocket engine;*

*a valve configured to control the flow of the oxidizer through the combustion port;*

*a nozzle in fluid communication with the combustion port; and*

*a casing, in which the fuel grain, the oxidizer source, and the valve are housed within the casing, and in which the nozzle extends beyond an end of the casing.*

*50. A fuel grain for a hybrid rocket engine, the fuel grain comprising:*

*layers of fuel grain material, in which the fuel grain material comprises a mixture of a hybrid rocket fuel material and a nanoscale metallic material, and in which each layer of the fuel grain material comprises beads of a combustible substance;*

*in which each layer of fuel grain material is bonded to an adjacent layer of fuel grain material to form a generally cylindrical fuel grain having a combustion port defined by an inner wall of the fuel grain, the combustion port extending axially through the fuel grain,*

*in which the inner wall of the fuel grain is formed of beads of the combustible substance from at least some of the multiple layers.*

*51. The fuel grain of claim 50, in which each layer of the multiple layers is planar.*

*52. The fuel grain of claim 50, in which the inner wall of the fuel grain is textured with ribs.*

*53. The fuel grain of claim 50, in which the inner wall of the fuel grain is textured with one or more of dimples, undulations, protrusions, or depressions.*

*54. The fuel grain of claim 50, in which when viewed along a longitudinal axis of the combustion port, the inner wall of the fuel grain defines alternating protrusions and depressions.*

*55. The fuel grain of claim 50, in which the inner wall of the fuel grain is textured with one or more of a corrugation pattern, a truncated pyramidal pattern, or a polygonal pattern.*

*56. The fuel grain of claim 50, in which the texture of the inner wall of the fuel grain is configured to create a swirling current of oxidizer flowing through the combustion port during operation of the hybrid rocket.*

*57. The fuel grain of claim 50, in which a surface of each layer of fuel grain material is textured.*

*58. The fuel grain of claim 50, in which the fuel grain is configured such that when the inner wall of the fuel grain ablates due to combustion in the combustion port, a new textured surface of the fuel grain is exposed to the combustion port.*

*59. A fuel grain assembly comprising:*

*multiple of the fuel grains of claim 50,*

*in which an end of fuel grain is bonded to an end of an adjacent fuel grain to form an elongated fuel grain assembly, and in which the combustion ports of the multiple fuel grains are aligned to define an elongated combustion port of the fuel grain assembly.*

*60. The fuel grain of claim 50, in which the fuel grain is fabricated in a freeform fabrication process.*

*61. The fuel grain of claim 50, in which the layers of fuel grain material are fabricated in an extrusion process.*

*62. The fuel grain of claim 50, in which the fuel grain material comprises an Acrylonitrile Butadiene Styrene (ABS) thermoplastic.*

*63. The fuel grain of claim 50, in which the nanoscale metallic material comprises nanocomposite aluminum powder or nanoscale aluminum particles.*

*64. The fuel grain of claim 63, in which the nanoscale metallic material comprises nanocomposite aluminum powder or nanoscale aluminum particles passivated with a polymer.*

*65. The fuel grain of claim 50, in which the fuel grain material comprises between 75% and 95% by mass of the hybrid rocket fuel material and between 5% and 25% by mass of the nanoscale metallic material.*

*66. The fuel grain of claim 50, in which the combustion port has a cross-sectional shape that is a circle, oval, ellipse, polygon, quatrefoil, or star.*

*67. The fuel grain of claim 50, comprising a thermally insulating material encasing the fuel grain.*

*68. A hybrid rocket engine comprising:*

*the fuel grain of claim 50;*

*an oxidizer source configured to provide a flow of an oxidizer through the combustion port during operation of the hybrid rocket engine;*

*a valve configured to control the flow of the oxidizer through the combustion port;*

*a nozzle in fluid communication with the combustion port; and*

*a casing, in which the fuel grain, the oxidizer source, and the valve are housed within the casing, and in which the nozzle extends beyond an end of the casing.*

*69. A fuel grain for a hybrid rocket engine, the fuel grain comprising:*

*a generally cylindrical body formed of a fuel grain material, in which the fuel grain material comprises a mixture of a hybrid rocket fuel material and a nanoscale metallic material, and in which the fuel grain material comprises a combustible substance;*

*in which a combustion port extends axially through the body, the combustion port being defined by a textured inner wall of the body, and*

*in which the fuel grain is configured such that when the textured inner wall of the body ablates due to combustion in the combustion port, a new textured surface of fuel grain material is exposed to the combustion port.*

*70. The fuel grain of claim 69, in which the inner wall of the body is textured with ribs.*

*71. The fuel grain of claim 69, in which the inner wall of the body is textured with one or more of dimples, undulations, protrusions, or depressions.*

*72. The fuel grain of claim 69, in which when viewed along a longitudinal axis of the combustion port, the inner wall of the body defines alternating protrusions and depressions.*

*73. The fuel grain of claim 69, in which the inner wall of the body is textured with one or more of a corrugation pattern, a truncated pyramidal pattern, or a polygonal pattern.*

*74. The fuel grain of claim 69, in which the texture of the inner wall of the body is configured to create a swirling current of oxidizer flowing through the combustion port during operation of the hybrid rocket.*

*75. A fuel grain assembly comprising:*

*multiple of the fuel grains of claim 69,*

*in which an end of fuel grain is bonded to an end of an adjacent fuel grain to form an elongated, generally cylindrical fuel grain assembly, and in which the combustion ports of the multiple fuel grains are aligned to define an elongated combustion port of the fuel grain assembly.*

*76. The fuel grain of claim 69, in which the fuel grain is fabricated in a freeform fabrication process.*

*77. The fuel grain of claim 69, in which the fuel grain material comprises an Acrylonitrile Butadiene Styrene (ABS) thermoplastic.*

*78. The fuel grain of claim 69, in which the nanoscale metallic material comprises nanocomposite aluminum powder or nanoscale aluminum particles.*

*79. The fuel grain of claim 78, in which the nanoscale metallic material comprises nanocomposite aluminum powder or nanoscale aluminum particles passivated with a polymer.*

*80. The fuel grain of claim 69, in which the fuel grain material comprises between 75% and 95% by mass of the hybrid rocket fuel material and between 5% and 25% by mass of the nanoscale metallic material.*

*81. The fuel grain of claim 69, in which the combustion port has a cross-sectional shape that is a circle, oval, ellipse, polygon, quatrefoil, or star.*

*82. The fuel grain of claim 69, comprising a thermally insulating material encasing the fuel grain.*

*83. A hybrid rocket engine comprising:*

*the fuel grain of claim 69;*

*an oxidizer source configured to provide a flow of an oxidizer through the combustion port during operation of the hybrid rocket engine;*

*a valve configured to control the flow of the oxidizer through the combustion port;*

*a nozzle in fluid communication with the combustion port; and*

*a casing, in which the fuel grain, the oxidizer source, and the valve are housed within the casing, and in which the nozzle extends beyond an end of the casing.*

*84. A fuel grain for a hybrid rocket engine, the fuel grain comprising:*

*multiple beads of fuel grain material, each bead comprising a combustible substance, wherein the multiple beads are disposed adjacent to one another and bonded together to form a generally cylindrical fuel grain;*

*in which the fuel grain has an inner wall that defines a combustion port extending axially through the fuel grain,*

*in which the inner wall of the fuel grain is textured, and in which the texture of the inner wall of the fuel grain is configured to create a swirling current of oxidizer flowing through the combustion port during operation of the hybrid rocket.*

*85. The fuel grain of claim 84, in which the inner wall of the fuel grain is composed of beads of the fuel grain material.*

*86. The fuel grain of claim 84, in which the inner wall of the fuel grain is textured with ribs.*

*87. The fuel grain of claim 84, in which the inner wall of the fuel grain is textured with one or more of dimples, undulations, protrusions, or depressions.*

*88. A fuel grain for a hybrid rocket engine, the fuel grain comprising:*

*layers of fuel grain material, in which each layer of the fuel grain material comprises beads of a combustible substance;*

*in which each layer of fuel grain material is bonded to an adjacent layer of fuel grain material to form a generally cylindrical fuel grain having a combustion port defined by an inner wall of the fuel grain, the combustion port extending axially through the fuel grain,*

*in which the inner wall of the fuel grain is formed of beads of the combustible substance from at least some of the multiple layers, and in which the texture of the inner wall of the fuel grain is configured to create a swirling current of oxidizer flowing through the combustion port during operation of the hybrid rocket.*

*89. The fuel grain of claim 88, in which the inner wall of the fuel grain is textured with ribs.*

*90. The fuel grain of claim 88, in which the inner wall of the fuel grain is textured with one or more of dimples, undulations, protrusions, or depressions.*

*91. A fuel grain for a hybrid rocket engine, the fuel grain comprising:*

*a generally cylindrical body formed of a fuel grain material, in which the fuel grain material comprises a combustible substance;*

*in which a combustion port extends axially through the body, the combustion port being defined by a textured inner wall of the body, in which the texture of the inner wall of the fuel grain is configured to create a swirling current of oxidizer flowing through the combustion port during operation of the hybrid rocket, and*

*in which the fuel grain is configured such that when the textured inner wall of the body ablates due to combustion in the combustion port, a new textured surface of fuel grain material is exposed to the combustion port.*

*92. The fuel grain of claim 91, in which the inner wall of the fuel grain is textured with ribs.*

*93. The fuel grain of claim 91, in which the inner wall of the fuel grain is textured with one or more of dimples, undulations, protrusions, or depressions.*

* * * * *